United States Patent [19]

Young

[11] Patent Number: 4,757,241
[45] Date of Patent: Jul. 12, 1988

[54] PWM SYSTEM FOR ECM MOTOR

[75] Inventor: Glen C. Young, Fort Wayne, Ind.

[73] Assignee: General Electric Company, Fort Wayne, Ind.

[21] Appl. No.: 109,535

[22] Filed: Oct. 19, 1987

[51] Int. Cl.$^4$ .............................................. H02P 6/02
[52] U.S. Cl. ................................... 318/254; 318/138; 318/599; 318/341
[58] Field of Search ................. 318/138, 254, 341, 599

[56] References Cited

U.S. PATENT DOCUMENTS

| | | | |
|---|---|---|---|
| 4,485,337 | 11/1984 | Sandusky | 318/341 X |
| 4,546,293 | 10/1985 | Peterson et al. | 318/254 |
| 4,583,028 | 4/1986 | Angersbach | 318/254 |
| 4,642,537 | 2/1987 | Young | 318/254 |
| 4,654,566 | 3/1987 | Erdman | 318/254 |

Primary Examiner—Benjamin Dobeck
Attorney, Agent, or Firm—Ralph E. Krisher, Jr.

[57] ABSTRACT

A pulse width modulation control system for an electronically commutated motor (ECM) adapted to be energized from a DC power source includes a power switching system coupled in circuit with each winding stage terminal of the ECM for selectively coupling each terminal to the DC power source for applying a DC voltage to selected ones of the winding stages of the ECM in a preselected sequence to effect energization of the ECM. The control system includes signal processing circuitry for generating switching signals for identifying selected power switching devices for energization in order to connect each terminal of the ECM to the power source in the preselected sequence. A pulse width modulation (PWM) circuit generates PWM enables signals for energizing the selected power switching devices and includes a clock for generating periodic clock signals defining sequential clock intervals of predetermined duration. A logic circuit is coupled to the PWM circuit for limiting the cycling of the PWM enable signal to once per clock interval.

14 Claims, 11 Drawing Sheets

PWM SYSTEM FOR ECM MOTOR

The present invention relates to motor controlled systems and, more particularly, to pulse width modulation control of an electronically commutated motor.

BACKGROUND OF THE INVENTION

Power control systems for electronically commutated motors (ECM), sometimes referred to as brushless direct current (DC) motors, may advantageously utilize pulse width modulation (PWM) techniques for controlling motor operation. In general, such systems employ controllable power switching devices such as, for example, power transistors, silicon controlled rectifiers (SCR) or gate turn-off devices (GTO), serially connected between a power source and appropriate terminals of the motor. For a three phase motor, the system may utilize a three phase bridge arrangement with each of the three motor power terminals being connected to a corresponding leg of the three phase bridge. Each leg of the bridge may include a series connected pair of switching devices, one of the devices being operable to connect the motor terminal to a positive voltage source for supplying current to the motor and the other of the devices being operable to connect the motor terminal to a negative voltage source for allowing current to circulate out of the motor. Each switching device is responsive to a gating signal for becoming conductive and allowing current to pass in the associated winding phase of the motor. The gating signals are coupled to selected ones of the switching devices in an ECM control system in a manner to energize the windings of the motor in a predetermined sequence. In a PWM system, either a current monitoring circuit or a voltage control circuit is effective to generate drive enable signals when motor current and/or voltage is less than a predetermined value. The driven enable signal, which is the pulse width modulated signal and is hereinafter referred to as the PWM enable signal, allows the gating signals to be coupled to the appropriate switching devices. Removal of the PWM enable signal inhibits coupling of the gating signals to the power switching devices.

Pulse width modulation of the drive enable signal may be used to establish an average voltage or a desired motor current. Since motor torque is a function of motor current, torque can be controlled by regulating current so long as adequate voltage is available. Since motor speed is a function of average motor voltage, speed can be controlled by regulating average voltage so long as adequate current rating is available in the power devices. In systems using PWM for voltage control, the voltage coupled to a load is defined by the PWM duty cycle multipled by the available supply voltage. The switching frequency, i.e., the cycle time, is generally constant so that voltage regulation requires only a determination of the ratio of conduction to non-conduction time during each cycle.

PWM systems which regulate current have required continuous monitoring of load current to avoid uncontrolled high frequency switching, or have exhibited discontinuity in control output when load current approaches the regulated value, or have not provided for a smooth transition from a current control mode to a voltage control mode. If load current cannot be continuously monitored, such as, for example in a full wave bridge switching circuit for an ECM motor with back EMF rotor position sensing, a means for controlling the interval of the off or non-conduction time is required to prevent excessive high frequency switching. Two common methods employ either a free-running oscillator or a monostable timer. The free-running oscillator is used to establish a fixed maximum frequency of operation. The monostable timer is used to establish a fixed off time. The circuit which establishes a fixed maximum frequency of operation utilizes a flip-flop clocked by the free-running oscillator. The oscillator generates clock signals which establish the PWM cycle. This first type circuit exhibits a discontinuity when load current is near a regulated value since the PWM enable signal will occur in near coincidence with the oscillator clock signals and result in alternate cycles being off. Another type circuit uses a monostable timer to latch a flip-flop and effect a drive enable delay. This second type circuit creates a fixed off time and introduces a problem in transitioning from current to voltage control since voltage control generally requires a fixed integration interval for developing a time integral of voltage applied to a load such as an ECM.

Each of these circuits have their advantages and disadvantages. The fixed frequency oscillator is the best means for average voltage control; however, unless other means are provided, this control approach produces a discontinuity in control output as a current regulator when the current approaches the regulate value at near 100% on time of the fixed period. Even if other means are used to avoid the discontinuity at near 100% on time, the off interval is not fixed but is the remaining interval of the fixed period of the oscillator, which will often result in inadequate time for the decay of the inductive stored current in the load to permit a sustained turn on at the beginning of the next oscillator period. The fixed off time one shot is the best means for current control; however, it does not provide a smooth transistion to voltage control and can at light load conditions lead to higher than desired switching frequency.

The free-running oscillator approach can be improved by inserting a fixed off-time interval at the end of each oscillator cycle. This off-time will avoid the near-coincidence of the oscillator clock signal and drive enable signal. However, the result is a limit on the system power output to a percentage of the cycle set by the value of the off-time. In other words, since the cycle time is fixed, the maximum PWM ratio is set by the fixed off time.

While it would appear that the above mentioned disadvantages could be overcome by changing the oscillator frequency, such changes may result in increased switching losses (thermal dissipation) in the power switching devices driven by the PWM system, i.e., thermal dissipation increases with increases in switching frequency. Fixed clock rate PWM systems are therefore preferred in order to limit switching losses to predetermined maximum values. However, fixed clock rate circuits also introduce an unfavorable ratio of peak current to average current in ECM control systems since the clock rate can only be optimized for either low speed or high speed operation but not both.

In some applications the switching rate of a PWM system can be limited by the rise and fall time of load current. However, in an ECM system, the rise and fall time of the load current varies over a wide range as a function of motor speed and is therefore not reliable for limiting switching rates. Even if switching rates were predictable, a low inductance short-circuit would result in unacceptable high switching rates.

Another disadvantage in ECM systems is that motor circulating current is not available for direct observation when some of the power switching devices, for example, the lower rail devices in a full bridge circuit, are being switched under PWM control. This disadvantage requires reliance on either a fixed clock rate PWM circuit or a fixed off-time circuit to reinstate conduction after a preset maximum current has caused the switching devices to be turned off since the magnitude of current decay in the motor windings cannot be monitored. A fixed off-time circuit is capable of a timed off-interval consistent with an optimal current decay for high speed motor operation but allows too high a switching rate at low speed motor operation thus requiring switching with higher thermal capacity. In comparison, a fixed clock rate PWM circuit limits the switching rate of power control devices at all motor speeds. However, at high speeds the rate of current decay in the motor windings is fast. At a fixed clock rate, the current will have dropped to an unsatisfactory low level before a switch is again rendered conductive.

SUMMARY OF THE INVENTION

It is an object of the present invention to provide a pulse width modulated power control system for an ECM or other permanent magnetic motor which overcomes the above discussed disadvantages and features, as well as others, of the prior art. Among the particular objects and features of the invention there will be noted an improved latch control circuit and method for preventing alternate cycle ON-OFF discontinuity produced when a PWM reset occurs in near coicidence with a PWM clock signal; an improved circuit and method for limiting cycling of PWM signals during a single clock interval; an improved circuit and method for enhancing the ratio of average to peak current in a PWM ECM without operating at high frequency; an improved circuit and method for establishing a minimum OFF interval in a PWM cycle; and an improved circuit and method for providing optimum current decay at high motor speed while inhibiting high PWM switching rates at low motor speeds.

In general, the invention comprises in an exemplary embodiment a PWM control system for an electronically commutated motor (ECM) adapted to be energized from a direct current power source and including a stationary assembly having a plurality of winding stages adapted to be electronially commutated in at least one preselected sequence, and a rotatable assembly associated in a selective magnetic coupling relation with the winding stages, each winding stage having a terminal associated therewith. The control system utilizes an electronic switching means connected to each winding stage terminal for selectively coupling each terminal to the direct current power source for applying to at least some of the winding stages a DC voltage in the at least one preselected sequence for supplying the current to the winding stages to effect the energization of the ECM and the rotation of the rotatable assembly. The system further includes clock means for providing periodic clock signals for establishing a pulse width modulation cycle and signal processing means for generating switching signals for identifying selected ones of the electronic power switching means for energization in order to connect each terminal to the DC power source in the preselected sequence. Pulse width modulation means is provided for generating a PWM enable signal for energizing the selected ones of the electronic power switching means in pulse width modulation cycles. A current monitoring means provides a first signal when current supplied to the ECM is less than a predetermined value and a second signal when current supplied to the ECM is greater than the predetermined value. Logic means responsive to the second signal terminates the PWM enable signal to thereby remove gating signals from the electronic power switching means. In one embodiment, the logic means initiates the PWM enable signals in response to receipt of one of the clock signals occuring during the presence of the first signal from the current monitoring means. If the clock signal is received during the presence of the second signal, the clock signal is stored until the first signal appears and is then utilizied to generate the PWM enable signals. In another embodiment, the logic means is responsive to termination of a PWM enable signal during a PWM cycle for resetting the clock means for establishing another PWM cycle when at least a minimum time interval has elapsed since an immediately prior PWM cycle termination. In still another embodiment, the logic means limits the cycling of the PWM enable signal to once per clock interval. If desired, the logic means includes provisions for selectively establishing a minimum time period during each clock interval in which the PWM enable signal may be inhibited in order to provide a minimum OFF interval for current decay in each cycle.

In a further embodiment of the present invention, the current monitoring system is augmented by the addition of a voltage control system for regulating the average voltage applied to the ECM. The voltage control system is integrated with the current control system and includes means for terminating the PWM enable signal when a time integral of voltage applied to the ECM reaches a predetermined value. In a voltage control mode, the logic means provides for inhibiting the minimum time period or minimum OFF interval during each PWM cycle when the voltage control system is utilized to terminate a PWM enable signal. In a system utilizing both the current monitoring and voltage control arrangements, there is also provided event timing means for resetting the clock oscillator means upon termination of a PWM enable signal via the current monitoring apparatus when at least a minimum time interval has elapsed since an immediately preceding termination of a PWM enable signal. This additional embodiment provides for a minimum OFF interval for optimum current decay at high motor speed but inhibits too high a switch rate at low motor speed.

In an illustrative embodiment, there is illustrated one form of clock oscillator means which permits resetting of the clock oscillator means in response to termination of the PWM enable signal during a PWM cycle. The clock oscillator means is illustrated as an RC type voltage integrator operating from the actual voltage applied to the motor whereby the time integral voltage developed at the output of the integrator can be used both as a voltage control reference and as a timing waveform. A controllable electronic switch is connected to the RC oscillator to allow the oscillator to be reset in response to termination of the PWM enable signal. An even timer provides a representation of a time interval between successive terminations of the PWM enable signal which representation is compatred to a predetermined reference indicative of a minimum time interval whenever the PWM enable signal is terminated by the current monitoring means. When the time interval representation indicates an interval longer than the minimum time interval, a signal is provided to the electronic switching means coupled to the RC clock oscillator means to effect a reset of the clock oscillator. The event timer is connected in the system such that a reset in response to the voltage control does not effect a reset of the clock oscillator means.

BRIEF DESCRIPTION OF THE DRAWINGS

Corresponding reference characters refer to corresponding parts throughout the several views of the drawings.

The exemplifications set out herein illustrate preferred embodiments of the invention in one form thereof, and such exemplifications are not to be construed as limiting the scope of the invention in any manner.

DETAILED DESCRIPTION OF THE EMBODIMENT

Figure 1:
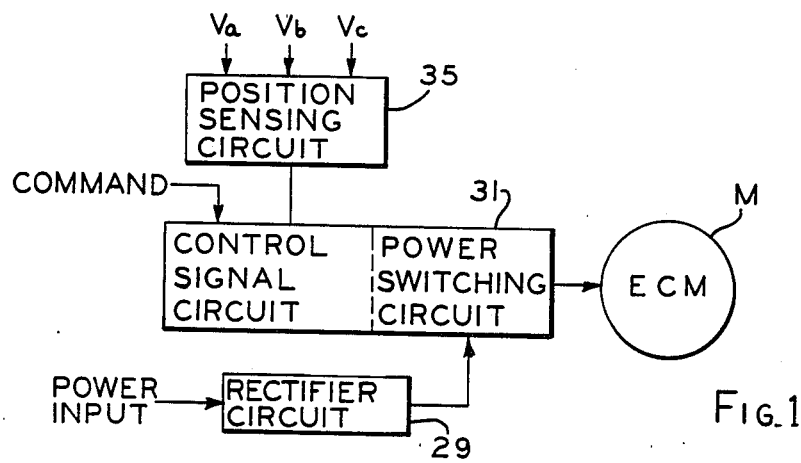
FIG. 1 is a block-diagrammatic schematic showing the major components of a control system in combination with an electronically commutated motor.
Figure 2:
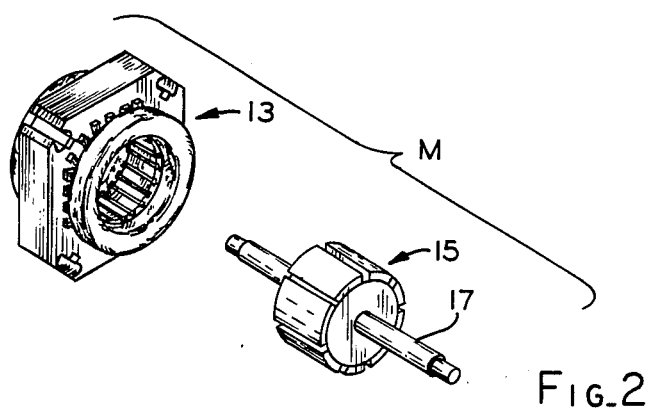
FIG. 2 is an exploded, perspective view of the main elements of an electronically commutated permanent magnetic DC motor which is controllable by a control system of the present invention.
Figure 3:
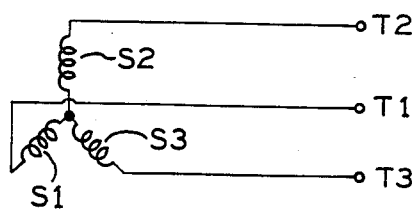
FIG. 3 is a schematic diagram showing the winding stages and terminals of the motor of FIG. 2.

Referring now to the drawings, and more particularly to FIG. 1, a motor control system with which the present invention may be used is illustrated schematically. The system includes an electronically commutated motor (ECM) M adapted to be energized from a DC power source and having (see FIG. 7) a stationary assembly including a stator or core 13 and a rotatable assembly including a permanent magnet rotor and a shaft 17. Stator 13 includes a plurality (e.g., three) of winding stages S1, S2 and S3 (FIG. 3) adapted to be electronically commutated in at least one preselected sequence, although the invention is not limited to that particular number of winding stages. One set of terminals $T_1$, $T_2$, $T_3$ are shown, there being at least one terminal associated with each winding stage.

When the winding stages S1, S2, S3 are energized in a temporal sequence, sets of eight magnetic poles are established that will provide a radial magnetic field which moves clockwise or counterclockwise around the stator bore depending on the preselected sequence or order in which the stages are energized. This moving field intersects with the flux field of the permanent magnet rotor to cause the rotor 15 to rotate relative to the stator 13 in the desired direction to develop a torque which is a direct function of the intensities or strengths of the magnetic fields. If a more detailed description of the construction of electronically commutated motor M is desired, reference may be had to U.S. Pat. No. 4,528,485, issued July 9, 1985 to John H. Boyd, Jr., which is incorporated herein by reference.

Further, while electronically commutated motor M is illustrated herein for purposes of disclosure, it is contemplated that other such motors of different constructions and/or different winding arrangements may be utilizied in one or another form of the invention so as to meet at least some of the objects thereof.

The winding stages of motor M, as explained in David M. Erdman, now U.S. Pat. No. 4,654,566, issued Mar. 31, 1987 are commutated without brushes by sensing the rotational position of the rotatable assembly or rotor 15 as it rotates within the bore of stator 13 and utilizing electrical signals generated as a function of the rotational position of the rotor to sequentially apply a DC voltage to each of the winding stages in different preselected orders or sequences that determine the direction of the rotation of the rotor. Position sensing may be accomplished by a position detecting circuit responsive to the back emf of the ECM to provide a simulated signal indicative of the rotational position of the motor's rotor to control the timed sequential application of voltage to the winding stages of the motor.

Referring back to FIG. 1, power supplied from a 115 V 60 Hz AC line or other suitable source is rectified by a rectifier circuit 29 which defines a DC power source and applied to a power switching circuit 31 which constitutes means for controlling the application of the DC voltage to the winding stages to provide a resultant effective voltage thereto. Power switching circuit 31 responds to a set of control signals from a control signal circuit 33 for commutating the winding stages by applying the DC voltage thereto in at least one preselected sequence to cause rotation of the rotor 15. Control signal circuit 33 thus constitutes means operable for electronic commutation of at least one at a time of the winding stages of the electronically commutated motor M by applying a DC voltage thereto from the power source in the at least one preselected sequence to effect the energization of the electronically commutated motor and the rotation of the rotor 15. The set of control signals of control signal circuit 33 are a function of rotor position—which is derived from a position sensing circuit 35—and selected conditions and parameters, such as applied voltage (as represented in part by an applied command signal).

Figure 4:
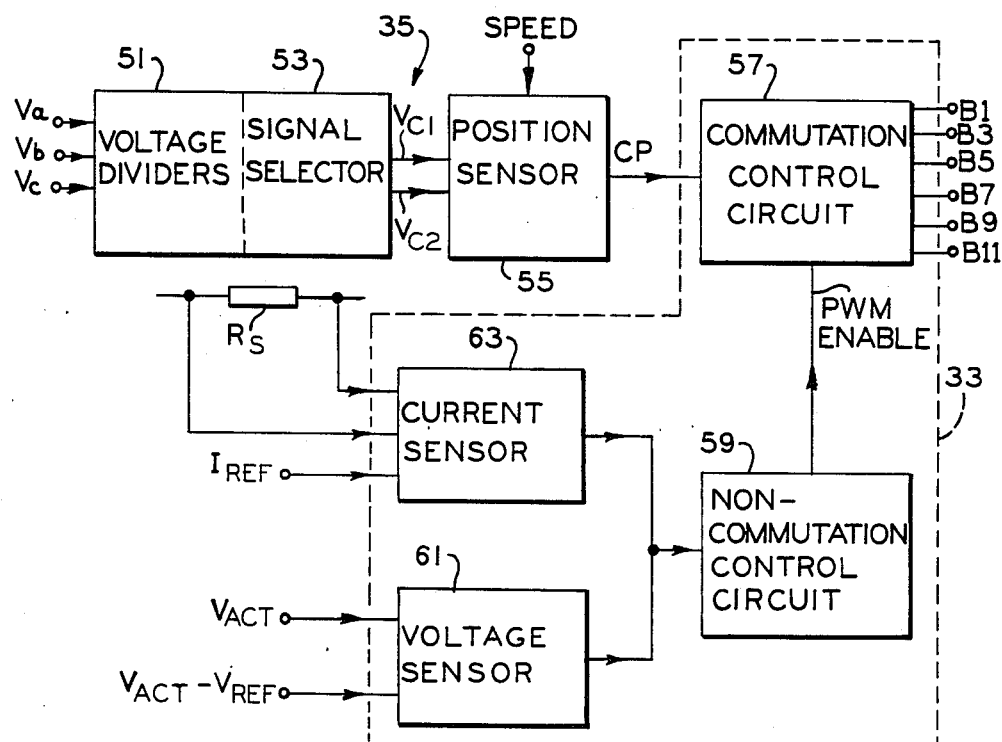
FIG. 4 is a block diagram showing in greater detail than FIG. 1 the major components of a control system which may incorporate the teaching of the present invention.

Position sensing circuit 35 (see FIG. 4) includes a set of voltage dividers 51 for sensing the terminal voltages of the winding stages, which terminal voltages include a back emf and a field collapse voltage caused by commutation current ending prior to appearance of the back emf. The particular output of the voltage dividers needed in any particular commutation period is the terminal voltage of the one winding stage which is not having DC voltage applied during that commutation period compared to neutral N. The terminal voltage of such unenergized winding stage is selected by a signal selector 53, which is responsive to the system's particular place in the commutation sequence at that time to supply the desired output of the voltage dividers to a position sensor circuit 55. The position sensor circuit 55 supplies a more accurate signal indicative of the angular position of the rotor, even under rapid rotor speed changes, to a commutation control circuit 57 whose outputs are the set of control signals B1, B3, B5, B7, B9, B11 to power switching circuit 31. Upon the rotor reaching a predetermined angular position, the commutation control circuit 57 (see FIG. 9 of said Erdman U.S. Pat. No. 4,654,566) changes the control signals which are supplied to the power switching circuit 31 to commutate the winding stages. The commutation control circuit 57 also has an input from a non-commutation control circuit 59 which, for purposes of this disclosure, will be understood to represent a pulse width modulation control signal or PWM ENABLE signal.

Figure 5:
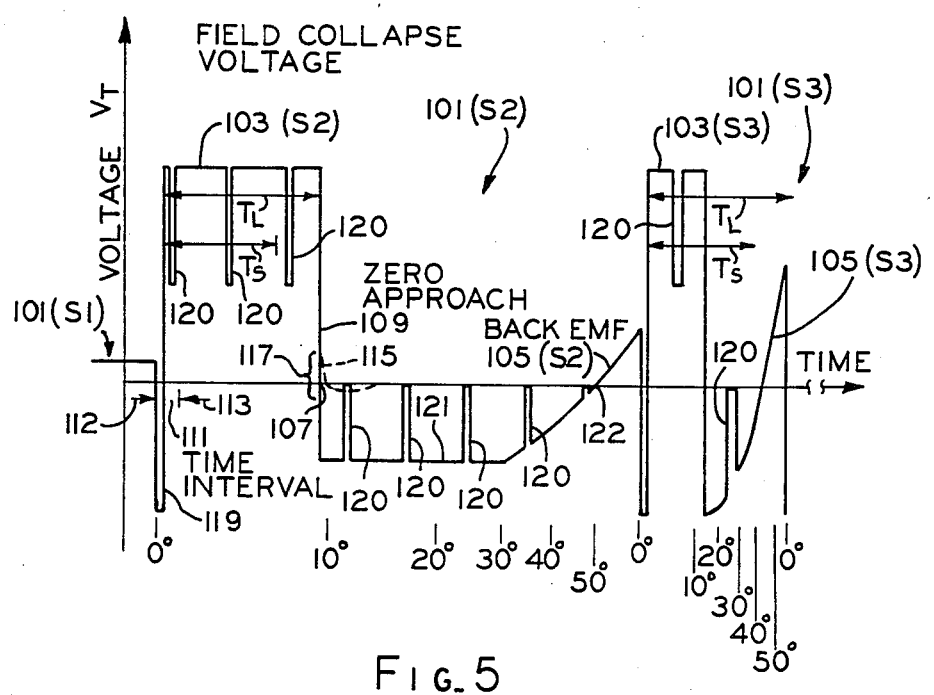
FIG. 5 is a graph of terminal voltage output versus time for illustrating voltage waveforms in a PWM ECM system.

For an appreciation of the effect of PWM control applied to an ECM system, reference may be had to FIG. 5 which illustrates a simplified view of the terminal voltages 101(S1) (just ending), 101(S2), and 101(S3) seen by the position sensor circuit 55 during successive commutation periods. The terminal voltages are derived from a different winding stage S1, S2 and S3 during each respective commutation period indicated as repetitively extending from zero degrees through 60 degrees. Immediately following the commencement of a commutation at zero degrees (time 112) the voltage crosses zero while a winding stage S2 is being switched into a sense connection. Next follows an illustrated 10° interval when the portion 103(S2) of terminal voltage 101(S2) is of the same polarity as the anticipated back emf 105(S2) at the end of the commutation period. However portion 103(S2) is not due to back emf. This field collapse voltage 103(S2) results from current which had been in the winding stage S2 while energized in the previous commutation period. While the field collapse voltage 103(S2) is illustrated as persisting for 10 degrees, the angular duration is actually highly motor and load dependent. The angular duration is also dependent on which transistors are pulse width modulated in power switching circuit 31, because of differences in the conditions that extract energy from the commutating current to produce field collapse voltage 103.

The terminal voltage 101 can evidence zero voltage or zero approach occurrences 120 caused by the use of pulse width modulation (PWM). When PWM is used in combination with a series inductance to limit inrush currents to the power switches, this voltage 120 can erroneously trigger a timing cycle before the completion of the field collapse voltage, unless the circuit is slow enough to ignore this relatively rapid transient. Usually adequate inrush protection will be obtained with an inductor that will cause a transient of less than five microseconds duration, which will be ignored by most discrete component operational amplifiers and comparators.

Of longer duration, however, are zero approach voltages which are the consequence of selecting a power switch for PWM purposes that allows the voltage across the sense winding to collapse for the duration of a PWM off period. If the power device that is turned off is of the same polarity as the device that had been driving the sensed winding prior to commutation, then the consequence of turning this device off is to allow the terminal voltages of all three windings to go to near the same potential as current is sustained in the one remaining on power device and the flyback diode of the alternate powered winding. If, however, the opposite polarity power device is selected for PWM, the voltage across the sensed winding will increase as the remaining on device will be of the opposite polarity to that at the terminal of the sensed winding. The first method of PWM device selection is referred to as slow commutation due to the reduced rate of energy extraction during PWM off, and the second described method is referred to as fast commutation due to the greater rate of energy extraction.

Figure 6:
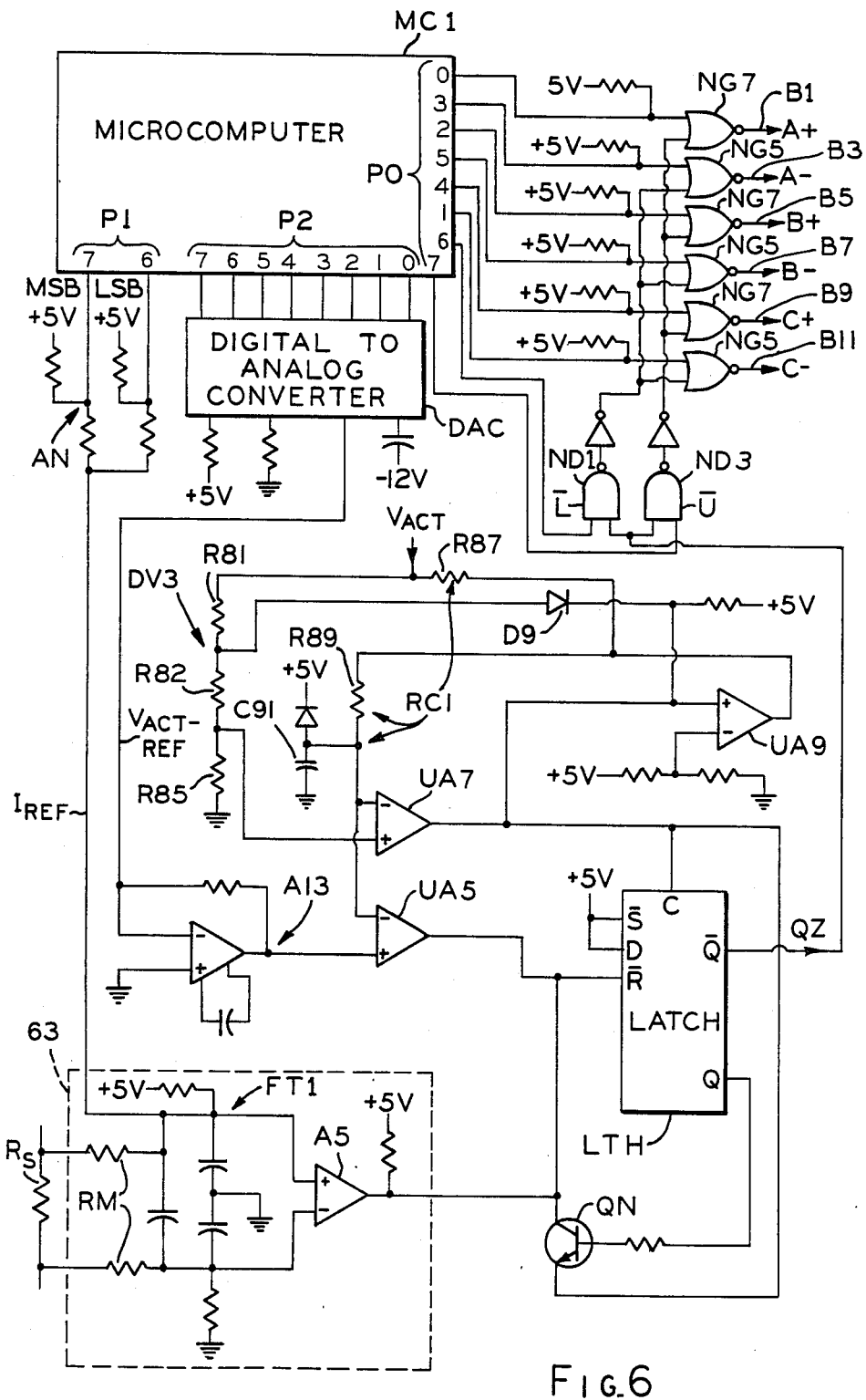
FIG. 6 is a schematic diagram of average voltage controlling circuitry for a PWM ECM system.

In FIG. 6, a microcomputer MC1 such as an Intel 8051 unit, is programmed to control the peak motor current and the average pulse width modulated (PWM) voltage applied to the winding stages, as well as for commutating the winding stages. The actual available power supply voltage applied at any given time to the winding stages is labelled $V_{ACT}$ and is an input to the circuitry of FIG. 6, as is the voltage across motor current sensing shunt resistor $R_s$ (see also FIG. 4).

The microcomputer MC1 supplies a two bit signal at port 1 (P1) representing the maximum desired peak motor current $I_{REF}$ on pins 6 and 7 (pin 7 representing the most significant bit MSB) through an adder network AN of resistors to the non-inverting input of an op-amp comparator A5. The voltage across shunt resistor $R_s$ is applied through a pair of matched resistors RM and a filter FT1 across the inputs of comparator A5, so the output of comparator A5 represents whether or not the actual peak motor current exceeds the reference peak motor current $I_{REF}$ set by the signals on pins 6 and 7 of the microcomputer. Comparator A5 thus constitutes means for comparing the peak motor current with the microcomputer-set current reference. During operation, if different motor current levels are desired at different points in the operation of the motor, the motor current can be changed directly by the microcomputer at the desired time by changing the signals on P1 pins 6 and 7. Of course, if finer gradations of motor current are desired than are available with only two bits, additional output pins of the microcomputer could be used to output a desired motor current word consisting of more bits. In such a case, the use of a digital-to-analog converter to convert the microcomputer output to analog form could be desirable.

When the actual motor current exceeds the microcomputer's reference motor current, the output of comparator A5 goes Low (logical 0). This Low is supplied to the low active reset ($\overline{R}$) input of a D-type latch LTH, which causes the $\overline{Q}$ output labelled QZ to go High (logical 1). Output QZ is supplied to a pair of NAND gates ND1 and ND3 whose other inputs are signals from port PO pins 6 an d7, respectively of the microcomputer. PO pins 6 and 7 determine which set of transistors (either the upper rail devices ($\overline{U}$) or the lower rail devices ($\overline{U}$)) in power switching circuit 31 are to be left on when power is cut off, to allow current in the windings to circulate, as is explained in the aforementioned David M. Erdman U.S. Pat. No. 4,654,566. The signals at PO pins 6 and 7 are complementary, so when output QZ goes High, it causes the output of one of gates ND1 and ND3 to go High and the other to stay Low. The output of gate ND1 is connected through an inverter to a set of three NOR gates NG5 whose outputs are the lower transistor control signals B3, B7 and B11 corresponding to winding stage connections A-, B- and C-. Likewise the output of gate ND3 is connected through an inverter to a set of three NOR gates NG7 whose outputs are the upper transistor control signals B1, B5 and B9 corresponding to winding stage connections A+, B+ and C+. When the ouput of gate ND1 goes Low because output QZ is High and PO pin 6 is High, gates NG5 are disabled. This breaks the circuit from $V_{ACT}$ through the energized windings to ground and thereby reduces motor current. Likewise, when the output of gate ND3 goes Low because output QZ is High and PO pin 7 is High, gate NG7 are disabled, which again breaks the circuit but at a different point therein. In either case, the signal from comparator A5 indicating that motor current has reached its desired peak value causes the external application of voltage to the windings to cease. Since the primary responsibility of comparator A5 is to reset the latch LTH, the signal from comparator A5 which effects a termination of power to the motor windings will be referred to as a RESET signal while the combination of output states of comparator A5 is referred to as a current regulate signal. Application of voltage to the windings is resumed when the PWM oscillator at UA7 clocks the latch LTH back on. Thus, the QZ signal represents a PWM signal hereinafter referred to as an ENABLE signal, which ENABLE signal is terminated by the RESET signal and initiated by the clock signal from UA7.

Microcomputer MC1 also controls the average voltage applied to the windings over a nominally 10 to 20 KHz PWM cycle, by supplying an 8-bit word representing a reference voltage over P2 pins 7-0 to a digital-to-analog converter DAC. As in the case of the peak current reference, the average voltage reference may be changed from cycle to cycle, or conceivably even within a cycle as required to obtain the desired operating chracteristics of motor M. The analog output $V_{ACT-REF}$ of converter DAC is supplied through an amplifier A13 configured as an inverter to the noninverting input of a comparator UA5 which compares the $V_{ACT-REF}$ reference voltage set by the micocomputer with a function of the actual DC power supply voltage $V_{ACT}$ being supplied to the motor windings. Specifically, the reference voltage $V_{ACT-REF}$ is compared by comparator UA5 with the integral of the actual applied voltage as approximated by a resistor-capacitor circuit R87,R89,C91 generally designated RC1 which constitutes means for generating a direct function of the applied voltage. When the voltage on the capacitor of circuit RC1 reaches the reference voltage, the output of comparator UA5 goes Low. Thus, comparator UA5 constitutes means for comparing the function of the applied voltage to a reference and for indicating when the function reaches the reference. Since the output of comparator UA5 is connected to the $\overline{R}$ input of latch LTH, the $\overline{Q}$ output of the latch goes High when the integral of the voltage reaches the voltage reference, which stops the application of external power to the winding stages as explained above in connection with motor current control.

Note that when the integral of the applied voltage reaches the reference, the voltage on the capacitor C91 of circuit RC1 is not reset (e.g., made to be zero). Rather, the integration is allowed to continue even though the external application of power has ceased. In other words, the cycle for power being applied to the windings is not stopped because the integral reaches the reference value. Rather, the cycle length is controlled by a voltage divider DV3 and a second comparator UA7. The inverting input of comparator UA7 is, like that of comparator UA5, connected to the integral approximating circuit RC1. The non-inverting input, however, is connected to voltage divider DV3.

Divider DV3, circuit RC1, and conparators UA7 and UA9 amount to a sawtooth oscillator circuit. Comparator UA7 signals when capacitor C91 should start charging and subsequently stop charging. Variations in the cycle length of the sawtooth oscillations which might occur in response to variations in the DC supply voltage $V_{ACT}$ are minimized or eliminated by applying $V_{ACT}$ both to divider DV3 and to charging circuit RC1. Potential cycle shortening which might occur due to a rise in $V_{ACT}$ causing capacitor C91 to charge to a given voltage in a shorter time is compensated by divider DV3 presenting a higher voltage to which C91 must charge before comparator UA7 changes state. The values of the resistors R81,R82,R85 in divider DV3 and components R87,R89 and C91 of circuit RC1 are selected so as to set the cycle length for the application of voltage to the windings at a predetermined value. Examples of component values are: R81=1.37 megohm; R83=13 K; R85=13 K; R87=5.5 meghom; R89=1.8 K, C91=0.001 microfarad. The actual applied voltage $V_{ACT}$ is supplied to the top of divider DV3 and the predetermined fraction thereof is supplied to the noninverting input of comparator UA7.

When the function of the applied voltage represented by the voltage on the capacitor C91 of circuit RC1 reaches the predetermined fraction of the applied voltage, the output of comparator UA7 goes Low. Thus, comparator UA7 constitutes means for signaling the end of each voltage cycle when the function of the applied voltage reaches the predetermined value. UA7 going low causes transistor QN to momentarily drive the $\overline{R}$ terminal of latch LTH low until output Q of LTH responds by going low. Transistor QN thus acts as an electronically controlled switch for connecting the output of comparator UA7 to the input of latch LTH, the base of transistor QN being connected to the Q output of the latch. When the Q output is driven low, the $\overline{Q}$ output goes High which, as above, results in the cessation of the application of external power to the winding stages if this has not already occurred. Latch LTH thus constitutes means for terminating the external application of voltage to the load when the function of the applied voltage reaches the reference and for terminating the present cycle.

The output of comparator UA7 is also connected to the non-inverting input of comparator UA9, whose other input is held at approximately 2.5 V. When the output of comparator UA7 goes Low, diode D9, connected between divider DV3 and the output terminal of UA7, pulls down the DV3 divider voltage and the output of comparator UA9 goes Low as well, controllably discharging the capacitor C91 of circuit RC1 through R89. When the capacitor C91 is discharged, the output of comparator UA7 goes High again because a DV3 voltage equal to about half the diode D9 diode drop is fed to the noninverting input of UA7. When comparator UA7 goes High, divider DV3 is restored since diode D9 becomes reversed biased. Also, at this time, comparator UA9 goes High so that $V_{ACT}$ resumes charging the capacitor C91, and a new cycle is begun. UA7 going high clocks the LTH $\overline{Q}$ output low which restores the application of external power to the winding stages. Comparator UA9, because it controllably discharges the capacitor, thus ensures that the minimum off period at the end of each cycle is of sufficient length to allow the comparator A5 to clear of a sensed peak current condition before a new cycle is begun. Failure to provide this feature results in a discontinuity of motor control as increasing current load first approaches the peak current regulate point.

From the above, it can be seen that the same circuit, namely circuit RC1, provides the integral of the applied voltage for comparison with the $V_{ACT-REF}$ voltage reference and the timing for terminating each cycle. Such an arrangement permits the use of low precision (e.g., ±10%) capacitors for C91 because the error in the capacitance of that capacitor of circuit RC1 cancels out from the calculation of the average voltage applied in a cycle to the winding stages. If separate resistor-capacitor circuits were used to calculate the integral and to determine the cycle length, the error in average voltage (which is their ratio) caused by the use of low precision capacitors in each circuit could be significant. However, with the present arrangement, the error in the integral value and the error in the cycle length caused by manufacturing variations in the capacitance of the capacitor of circuit RC1 in effect cancel out, resulting in much better accuracy.

Figure 7:
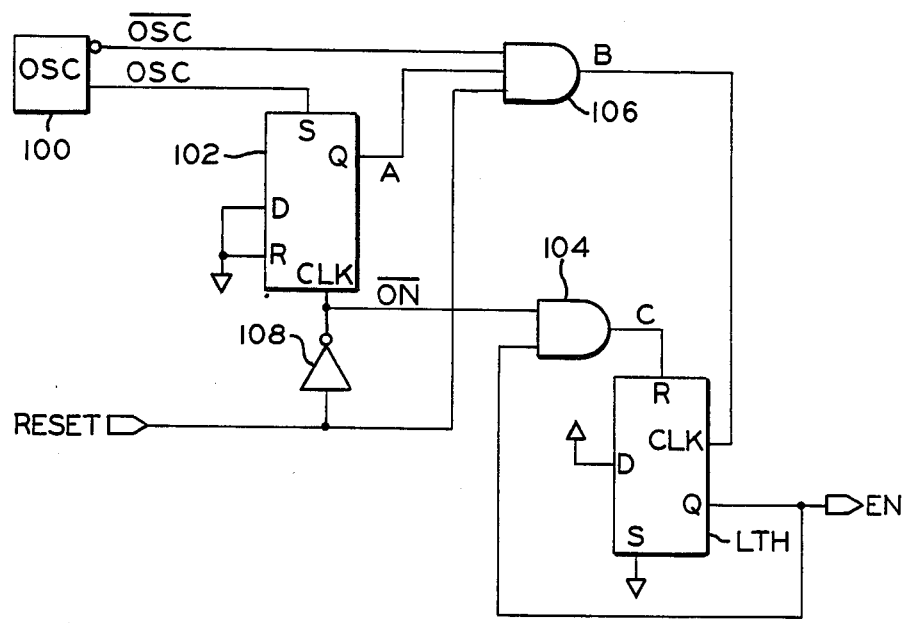
FIG. 7 is a schematic block diagram of a PWM latch control circuit in one form of this invention for preventing alternate cycle ON-OFF discontinuity from near coincidence of clock and current regulate signals.
Figure 11:
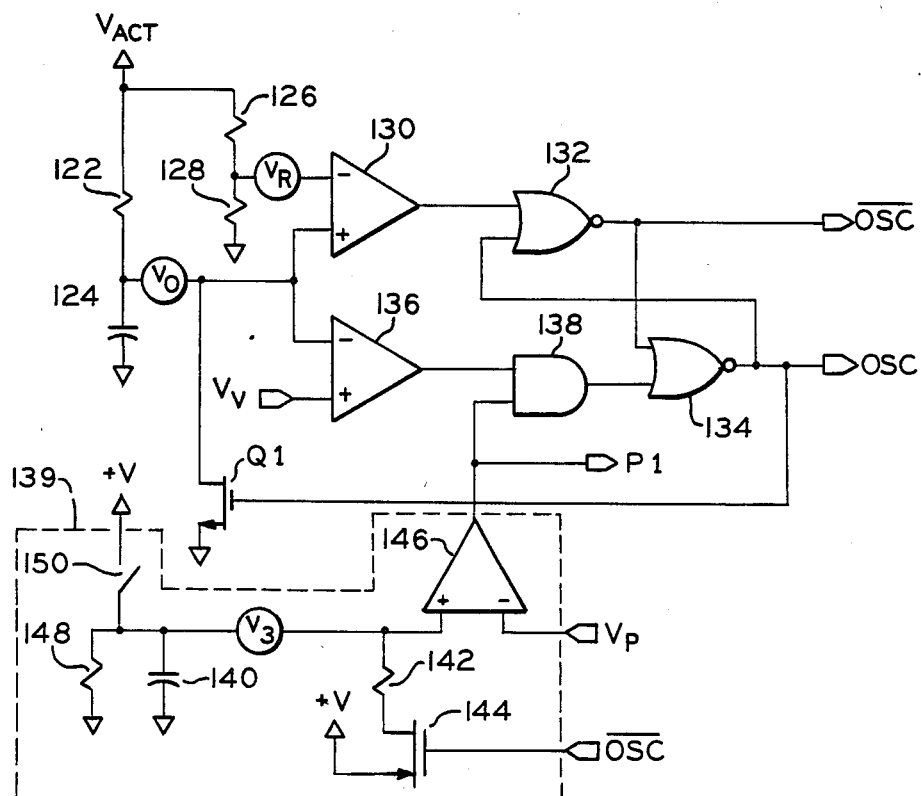
FIG. 11 is a PWM oscillator circuit which is suitable for use in generating required clock signals in both FIGS. 7 and 9.

While the system illustrated in FIG. 6 is effective to provide PWM control signals for operating motor M in the manner thus far described, FIG. 7 illustrates a modification for preventing alternate cycle ON-OFF discontinuity caused by near coincidence of the RESET signal from the comparator A5 (which was applied to the reset terminal $\overline{R}$ of latch LTH) and a clock signal from an oscillator 100. An additional D type flip-flop (DFF) 102 and a pair of AND gates 104, 106 are inserted in circuit with latch LTH. The RESET signal from comparator A5 is applied through an inverter 108 to a clock input terminal of DFF 102 and to a first input terminal of AND gate 104. In addition, the RESET signal is applied directly to a first input terminal of AND gate 106. The oscillator 100 provides both a clock signal OSC and an inverted clock signal $\overline{OSC}$. The signal $\overline{OSC}$ is supplied to a second input terminal of AND gate 106 while the signal OSC is coupled to a set input terminal of DFF 102. A third input terminal of AND gate 106 is coupled to a Q output terminal of DFF 102. An output terminal of AND gate 106 is coupled to a clock input terminal (CLK) of latch LTH. An output terminal of AND gate 104 is coupled to the reset terminal R of latch LTH. The D input terminal of latch LTH is connected to a positive voltage source while the set input terminal of latch LTH is grounded. In D type flip-flop 102, both the D and reset terminals are grounded. The Q output terminal of latch LTH, which provides the PWM ENABLE or QZ output signal for driving the PWM OR gates NG7 and NG5, is also coupled to a second input terminal of AND gate 104. It will be noted that the latch LTH in FIG. 7 is now arranged whereby the R and Q terminals are used rather than the $\overline{R}$ and $\overline{Q}$ terminals as was described with regard to FIG. 6. The choice of signal logic may vary between implementations depending upon which format is simpler to implement or describe. The election to use either positive or negative logic for this application is a matter of design choice. Where the signal from latch LTH or applied to LTH requires a reverse logic state, inverters may be employed in a manner well known in the art. An implementation of a circuit for generating both the OSC and $\overline{OSC}$ signals is shown in FIG. 11.

The action of DFF 102 is to store the clock signal OSC from oscillator 100 until the RESET signal at the reset input terminal, i.e., the signal from the current detector 63, is at a logic 1 level thereby indicating that the drive circuit supplying power to motor M should be enabled. When the RESET signal at the reset terminal is at a logic 1 level, the leading edge of the OSC signal applied to the SET terminal of the DFF 102 will cause its Q output to assume a set condition and enable the AND gate 106. This will then provide a clock signal to the clock input terminal CLK of latch LTH. The AND gate 104 assures that a race in the reestablishment of the ON condition and the delivery of the clock to latch LTH will not conflict with a still falling reset of latch LTH. The AND gate 106 also inhibits any rapid recycling during any interval that the oscillator output OSC is High and the Q output of DFF 102 is High.

When the current through the current shunt RS is greater than the reference level, the RESET signal will revert to a logic zero level thereby clocking DFF 102 causing its Q output to fall to a logic zero level and inhibiting the AND gate 106. At the same time, the inverted RESET signal indicated at $\overline{ON}$ will enable gate 104 and thus reset latch LTH so that its Q output goes to a logic 0 state. This action will limit the cycling of the enable or Q output signal of latch LTH to one cycle per oscillator clock period.

Figure 8:
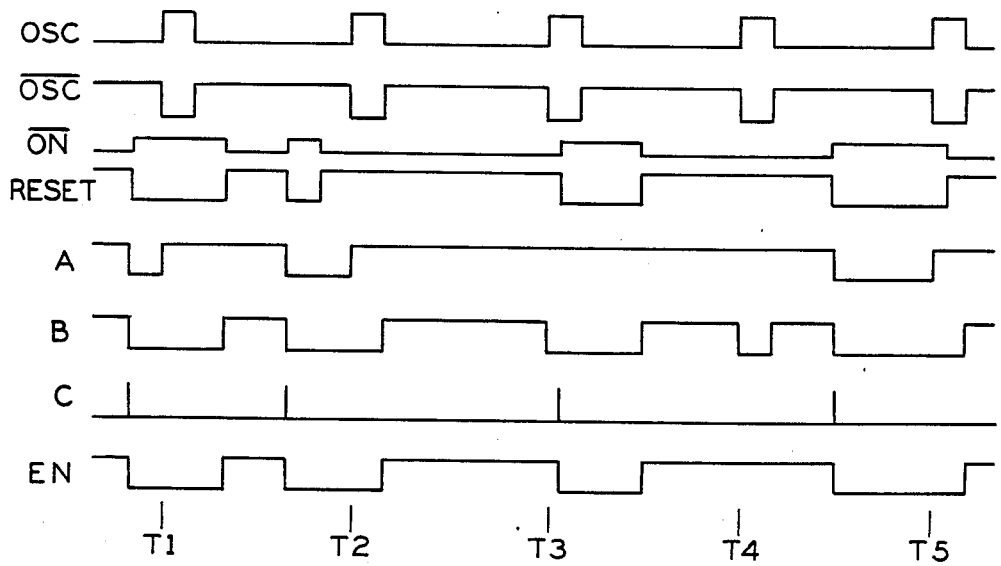
FIG. 8 is a waveform timing diagram of the latch control circuit of FIG. 7.

For a better understanding of the operation of the apparatus of FIG. 7, reference may be had to the timing diagrams illustrated in FIG. 8. The lower most line labelled EN for ENABLE represents the Q output signals from the latch LTH, which signals are coupled to the NAND gates ND1 and ND3 in FIG. 6. The ENABLE signal is the pulse width modulated or PWM signal described in the block diagram of FIG. 4. Microcomputer MC1 operates in the manner described above to select the switching device to which the PWM signal is coupled through the gates NG5 and NG7. The top diagrams of FIG. 8 represent the two oscillator output state signals OSC and $\overline{OSC}$. The line label RESET represents the peak current regulate signal from comparator A5 of FIG. 6. When the RESET signal is at a Low or logic zero state, the current through the shunt RS is above the threshold or current reference level and the power switching circuit is to be inhibited so that no additional current is supplied to the motor M. The timing lines labelled A, B and C represent, respectively, the Q output of DFF 102, the output signal from AND gate 106 and the output signal from AND gate 104.

From an examination of FIG. 8, it can be seen at time T1, that for a condition in which the current through shunt RS exceeds the reference current prior to receipt of the clock signal (OSC) from oscillator 100, and in which the duration of the Low state of the RESET signal extends beyond the clock signal interval, the ENABLE signal is inhibited for the duration of the RESET signal. At the end of the RESET signal time, the ENABLE signal is restored, i.e., the latch LTH changes state at the same time that the comparison amplifier A5 changes state or, more particularly, the ENABLE signal is restored upon re-establishment of the RESET signal.

At the time indicated at T2, the RESET signal has changed to a logic 0 state prior to receipt of an OSC clock pulse but reverted to a logic 1 state immediately thereafter, still prior to the receipt of the clock pulse. Under this condition, the ENABLE signal is removed as soon as the RESET signal goes to the logic 0 state. The ENABLE signal is not restored until the end of a clock signal.

At the time labelled T3, the RESET signal goes to a logic 0 state during a clock signal resulting in the ENABLE signal immediately dropping to its logic 0 state. In this condition, the clock signal is essentially stored so that as soon as the RESET signal reverts to a logic 1 state, the ENABLE signal immediately follows. At the time labelled T4, the clock signal occurs while the RESET signal is still at a logic 1 state. The ENABLE signal is not affected by the occurrence of the clock signal in the absence of any change in the RESET signal. Time T5 indicates the condition in which the RESET signal reverts to a logic 0 state prior to receipt of the clock signal but then reverts to its logic 1 state during the clock signal. As can be seen, the ENABLE signal immediately drops to a logic 0 state when the RESET signal goes to logic 0. However, the ENABLE signal is not restored to a logic 1 state until the end of the clock signal. Thus, the action of the additional flip-flop DFF 102 and the two AND gates 104 and 106 is to limit the cycling of the ENABLE signal to once per oscillator clock cycle or oscillator time period.

Figure 9:
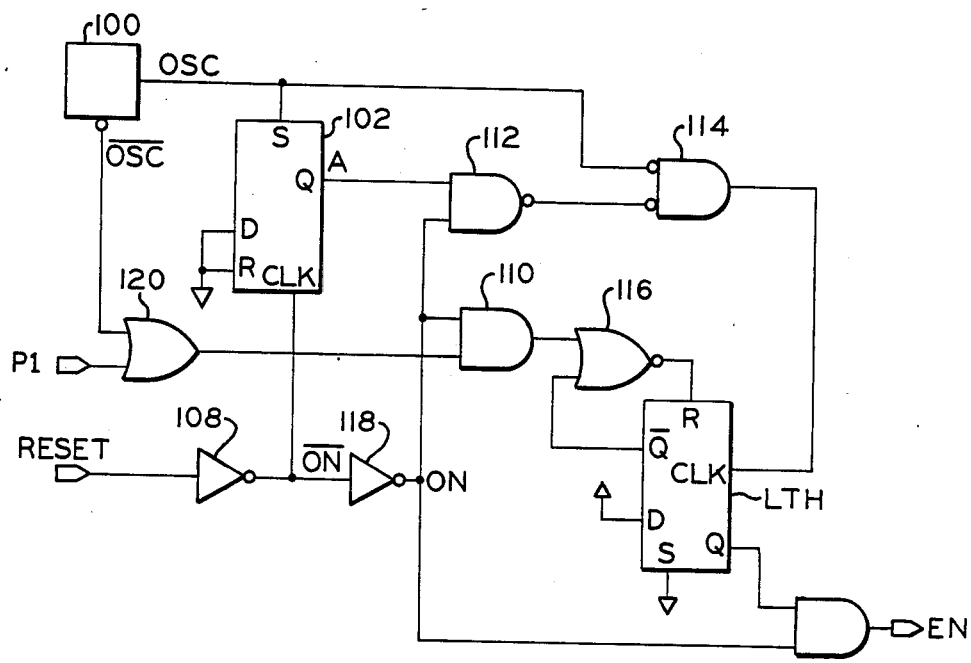
FIG. 9 is a schematic block diagram of another embodiment of PWM latch control circuitry according to the invention.

Turning now to FIG. 9, there is shown another form of PWM latch control circuit which divides the function of the logic gate 106 between two additional gates 110 and 112. The gates 110 and 112 are standard NAND logic gates and are simpler in construction than the three input AND gate 106 of FIG. 7. The two input AND gate 114 replaces the AND gate 106. The function of AND gate 104 in FIG. 7 is replaced by the NOR logic gate 116. An added inverter 118 assures that a low rate of rise and fall of the RESET signal will not result in ambiguous operation due to a different threshold at the devices 108, 110 and 112. An additional OR logic gate 120 is combined with the logic gate 110 to give the option of a fixed "OFF" interval at the end of each oscillator time period. Such a minimum OFF interval reduces the maximum output voltage as was described previously but can also reduce some audio noise produced by lower pulse width modulating frequencies. An input signal indicated as P1, when High or in a logic 1 state, inhibits the inclusion of the "OFF" interval and the operation is the same as that of FIG. 5.

Figure 10:
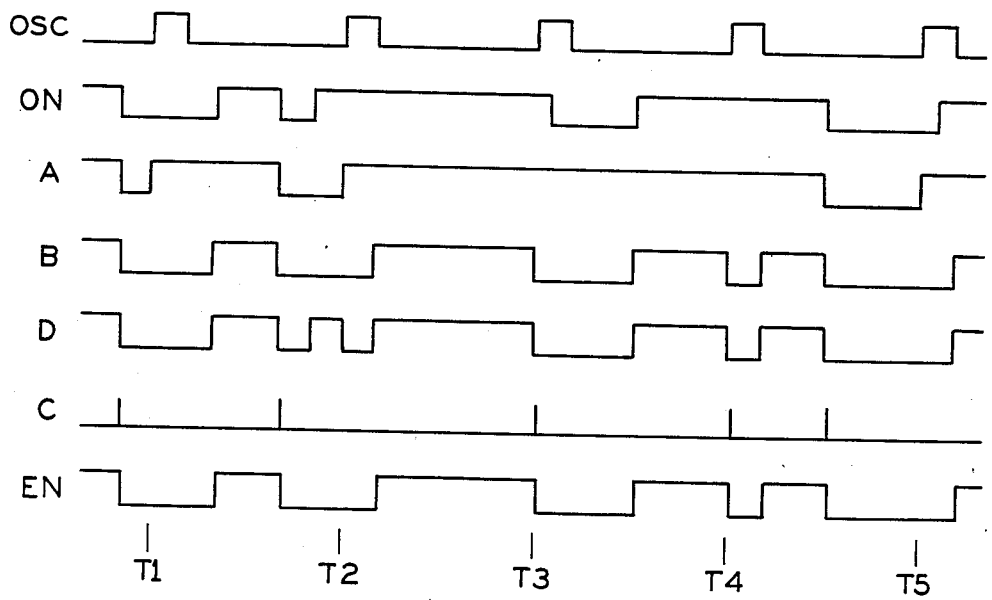
FIG. 10 is a waveform timing diagram of the latch control circuitry of FIG. 9.

The timing diagram of FIG. 10 illustrates the operation of the circuit of FIG. 9 for the condition for which the signal P1 is at a logic 0 level. The timing intervals indicated at T1, T2, T3 and T5 are essentially identical to the respective timing intervals T1, T2, T3 and T5 of FIG. 8. That is, for those intervals, the circuits of FIG. 7 and FIG. 9 operate identically. The interval indicated at T4 illustrates the "OFF" interval forced at the end of each oscillator period for that particular mode of operation. Note that the RESET signal stayed High during a clock interval but that the effect of the clock was to force the ENABLE signal to a logic 0 level during the clock interval. Thus, there is assured a minimum "OFF" interval at the end of each oscillator time period whereas the circuit of FIG. 7, as shown by the timing diagrams of FIG. 8 and particularly at the time T4, does not force an OFF interval so long as the RESET signal is at a logic 1 level.

For the purpose of simplifying some of the discussion to follow, reference is now made to FIG. 11 which illustrates a PWM oscillator of the type which can be used with either of the circuits of FIGS. 7 or 9. To some extent, the circuit of FIG. 11, which represents the circuit embodied in the oscillator 100 of FIGS. 7 and 9, is shown in the circuit of FIG. 6. In particular, the use of a resistor and capacitor network to create an RC timing circuit for generating a timing waveform can be found in the capacitor C91 and resistors R87 and R89 of FIG. 6. The oscillator of FIG. 11 provides for a sawtooth waveform which is useful for average voltage control as disclosed in U.S. Pat. No. 4,642,537 and also provides for the optional inclusion of the fixed "OFF" interval as well as controllably setting the duration of the OFF interval.

Figure 12:
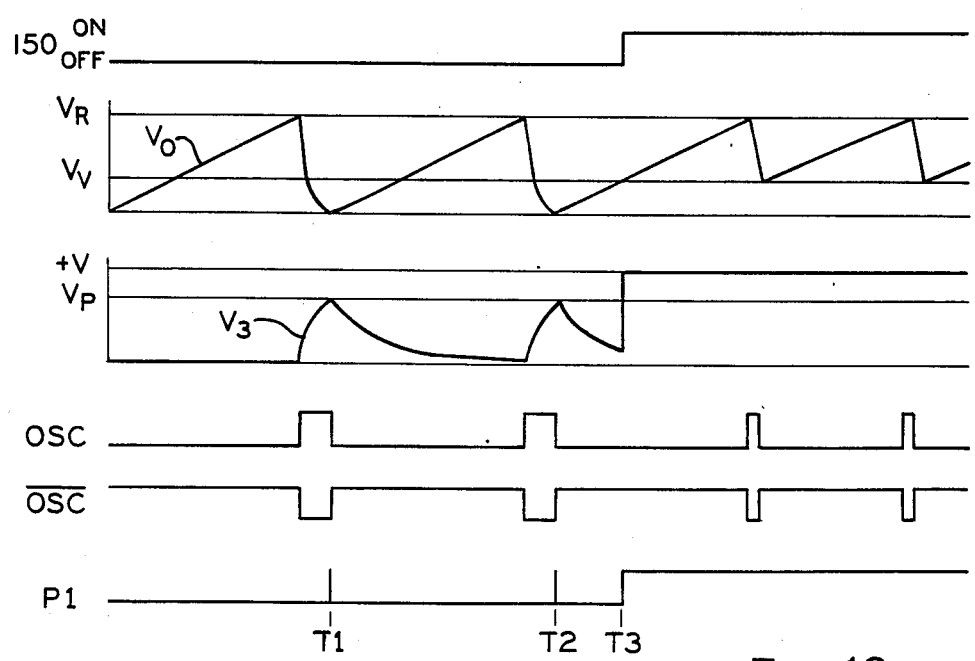
FIG. 12 is a waveform timing diagram of the PWM oscillator circuit of FIG. 11.

A resistor 122 serially connected with a capacitor 124 between the voltage reference $V_{ACT}$ and ground establish, in combination with the serially connected resistors 126 and 128, the timing interval for the oxcillator. For purposes of ease of understanding, reference will be made to the timing diagrams illustrated in FIG. 12 in conjunction with the description of FIG. 11. In FIG. 12, the oscillator waveform is indicated as Vo. This waveform appears at the circuit point labelled Vo in FIG. 11 at the junction intermediate the resistor 122 and capacitor 124. A comparator 130 has its inverting input terminal connected to a junction intermediate the resistors 126 and 128 for receiving a voltage reference signal VR. Since the resistors 126 and 128 are connected between ground and the voltage $V_{ACT}$, VR represents an intermediate voltage to which the voltage Vo is referenced. The Vo voltage at the junction between capacitor 124 and resistor 122 is coupled to the noninverting input terminal of comparator 130. The comparator 130 establishes the peak charge voltage of capacitor 124. Cross coupled NOR gates 132 and 134 act as an RS type flip-flop. When the comparator 130 changes state as a result of the voltage Vo reaching the reference voltage VR, the action is to effect a setting of the OR gates 132 and 134 so that the output signal labelled OSC from gate 134 becomes a logic 1 level and the output signal from gate 130 becomes a logic 0 level. These signals represent the oscillator output signals OSC and $\overline{OSC}$ previously noted for the oscillator 100 in FIGS. 7 and 9.

The output signal from gate 134 is coupled to a gate terminal of a MOSFET Q1 which has a collector terminal connected to the junction intermediate the resistor 122 and capacitor 124 and a drain terminal connected to ground. When the oscillator signal from gate 134 goes to a High level, the signal causes the FET Q1 to become conductive and immediately discharge the voltage on capacitor 124. The effect is therefore to reset the RC oscillator each time that the voltage Vo reaches the level of the voltage VR.

The flip-flop comprising the NOR gates 132 and 134 is reset by the action of a comparator 136. An inverting input terminal of comparator 136 is coupled to receive the Vo signal. The noninverting input terminal is connected to a reference voltage $V_v$ which may have a predetermined non-zero value. (See FIG. 12). When the capacitor voltage Vo is reset, the voltage Vo falls at least to the voltage $V_v$ causing the comparator 136 to change state and provide a gating signal through AND gate 138 to an input terminal of NOR gate 134. The effect is to reset the flip-flop comprising the NOR gate 132 and 134. The AND gate 138 is provided to allow reset to be inhibited for providing a fixed off interval at the end of each clock cycle. The PWM oscillator thus far described in FIG. 11 comprises clock means for providing periodic clock signals for establishing a PWM cycle wherein the clock signals OSC define sequential clock intervals of a predetermined duration.

The circuit indicated in block 138 acts as a latch to establish a fixed "OFF" interval during each PWM cycle, i.e., a minimum time period during which the PWM ENABLE signal is inhibited. The capacitor 140, resistor 142 and FET 144 establish the fixed "OFF" interval for the PWM oscillator. The FET 144 has a source terminal connected to a positive voltage source indicated as +V and a drain terminal connected through resistor 142 to the capacitor 140. A gate terminal of FET 144 is connected to receive the $\overline{OSC}$ signal from NOR gate 132. When the $\overline{OSC}$ signal is at the logic 0 level, the FET 144 is conductive allowing the capacitor 140 to charge through resistor 142. When the voltage V3 at the junction intermediate resistor 142 and capacitor 140 exceeds the reference voltage $V_p$, the OFF interval is terminated. The OFF interval is established by a comparator 146 which has its inverting input terminal connected to receive the voltage $V_p$ and its noninverting input terminal connected to the voltage V3. The output terminal of comparator 146 is connected to an input terminal of AND gate 138.

The signals developed at the output terminal of comparator 146 are the P1 signals referred to in the discussion of FIG. 9. During the time at which the $\overline{OSC}$ signal is at a logic 1 level, i.e., the time between clock signals, the voltage on capacitor 140 discharges through parallel connected resistor 148. If if is desired not to use the fixed OFF interval at the end of each oscillator time period, a switch 150 can be closed to connect the voltage +V directly to the junction intermediate resistor 142 and capacitor 140 so that the voltage V3 is clamped to +V and is always higher than the voltage $V_p$ causing the signal P1 to remain at a constant logic 1 state as shown begining at time T3 in FIG. 12. It should be noted that the effect of deleting the minimum OFF interval is also to change the timing interval since the capacitor 124 will only discharge to the voltage $V_v$ before the oscillator is reset by the action of comparator 136.

The discharge of the capacitor 124 to 0 volts is more suitable for average voltage control in compensating for input line voltage changes. When both minimum regulation error in response to line voltage changes is required and a maximum output of voltage is desired, the resistor 128 can be connected to a biased voltage equal to the voltage $V_v$ rather than to ground.

The arrangement of the circuit of FIG. 11 is such as to allow all of the circuit elements to the right hand side of each of the voltage points Vo, VR and V3 to be incorporated into an integrated circuit and yet retain the ability to optionally select the use of resistor 148 and capacitor 140 to establish a fixed off-time or to inhibit the fixed off-time without introducing high current in a discharge transistor, e.g., transistor 144. However, the circuit limits the selection of resistor 148 to a value greater than then required to develop a charge voltage in excess of the voltage reference $V_p$. More particularly, the voltage divider arrangement comprised of resistors 148 and 142 must be selected with reference to voltage +V such that the voltage V3 is greater than the voltage $V_p$. The value of resistor 148 must then be greater than the value of resistor 142 multiplied by the ratio of $V_p$ to the difference between +V and $V_p$. For this limitation of resistor 148, the charge interval for the capacitor 140 must be much shorter than the discharge interval between successive clock pulses. Compare, for example, the V3 charge interval at time T1 to the discharge interval between T1 and T2 in FIG. 12.

Figure 13:
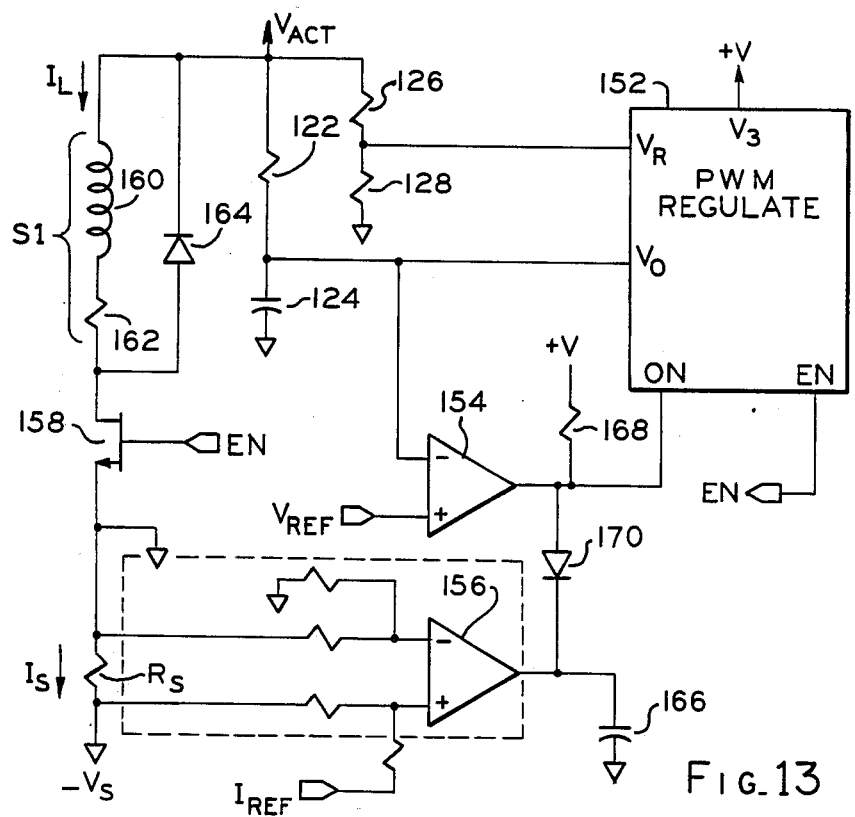
FIG. 13 is a schematic block diagram of a comprehensive PWM control system of the present invention with the major portion of FIGS. 9 and 11 combined into an integrated circuit.

FIG. 13 combines the elements of FIGS. 9 and 11 into a PWM regulate circuit 152 in which the input terminals labelled VR, Vo, V3, ON and EN correspond to the identically labelled junctions in FIGS. 9 and 11. This arrangement allows the PWM regulate circuit to be created as an integrated circuit with elements which vary the timing of the clock signals and their respective durations connected externally of the integrated circuit. The PWM regulate circuit 152 essentially replaced the latch LTH of FIG. 6. A comparator 154 in FIG. 13 corresponds to the comparator UA5 of FIG. 6 while the comparator UA7 of FIG. 6 has now been incorporated within the PWM regulate circuit 152. Similarly, the comparator 156 of FIG. 13 corresponds to the comparator A5 of FIG. 6. While the circuit 63' of FIG. 13 corresponds substantially to the circuit 63 of FIG. 6, some of the filtering elements have been omitted for ease of illustration. Also, for purpose of clarifying the use of the PWM regulate ENABLE signal, there is shown a schematic representation of one winding, for exmaple, S1 of FIG. 3, of the motor M selectively connected in circuit with the voltage $V_{ACT}$ by means of a series power switching transistor 158. The transistor 158 represents one electronic power switching means forming part of the power switching circuit 31 of FIG. 1 for selectively coupling each winding stage terminal to the DC power source. While the ENABLE signal is shown coupled to a base terminal of transistor 158, it will be appreciated that the ENABLE signal enables the NOR logic gates NB5 and NG7 to allow the power switch control signals from MC1 to energized selected ones of the power switches during the time interval when the ENABLE signal is at a logic 1 level thus connecting a motor winding (represented by an inductor 160 and resistor 162) in circuit with the voltage $V_{ACT}$ so that a motor current $I_L$ can flow. When the ENABLE signal is removed from the base of transistor 158, the energy in the motor winding causes an inductive current $I_L$ to circulate through the reverse connected free-wheeling diode 164. In the circuit as illustrated in FIG. 6, there are a plurality of power switching transistors corresponding to transistor 158, each of which is controlled by one of the outputs from the NOR gates NG5 and NG7. A particular one of the transistors to be energized in response to the ENABLE signal from the PWM regulate circuit 152 is selected by the microcomputer MC1.

Figure 14:
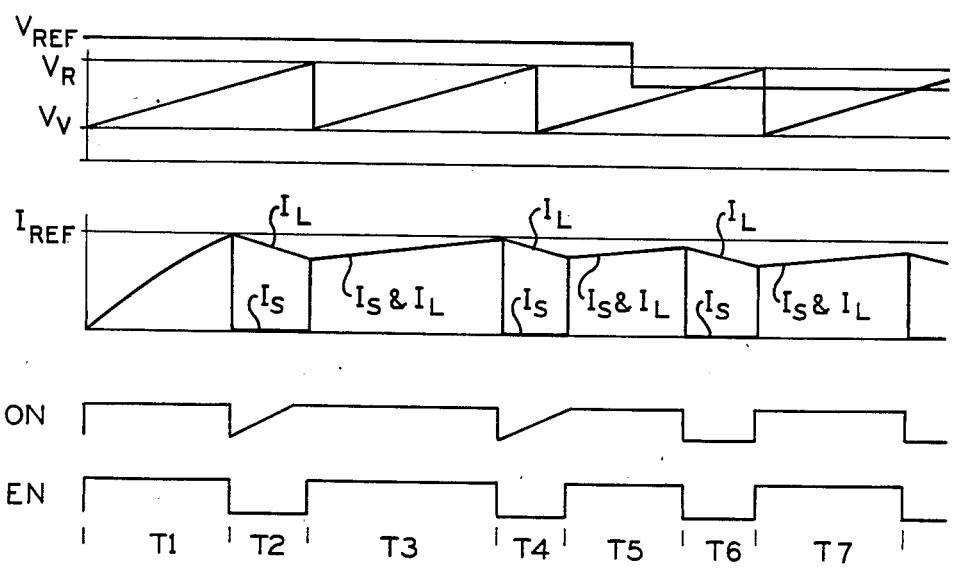
FIG. 14 is a waveform timing diagram for the circuit of FIG. 13.

The operation of the circuit of FIG. 13 can be understood by reference to the timing diagrams illustrated in FIG. 14. At the top of the timing diagrams is a simplified illustration of the repeating sawtooth timing voltage waveform Vo corresponding to the voltage developed across the capacitor 124. (A more precise waveform is shown in FIG. 12.) For purposes of illustration, the voltage reference $V_{REF}$ is shown overlapping the timing voltage waveform. Immediately below the timing waveform Vo is a highly simplified representation of the waveform corresponding to current $I_S$ through the current shunt RS and current $I_L$ through winding S1. As is apparent, when the transistor 158 is not conducting, motor winding current $I_L$ circulates through the freewheeling diode 164 and does not pass through the current shunt RS. That portion of the waveform labeled as $I_S$ & $I_L$ indicates current during the time period when transistor 158 is conducting, i.e., the current waveform measured by the current shunt RS represents load or motor winding current. When transistor 158 is not conductive, such as during time period T2, current $I_S$ is essentially non-existent while current $I_L$ decays due to the resistance 162 in the motor current loop. During the time period T3, the power switches are enabled and current $I_L$ through the selected motor winding increases until it reaches the current reference value $I_{REF}$ at which time the comparator 156 changes state and pulls the signal at the ON terminal of PWM regulate circuit 152 to a Low value therby terminating the ENABLE signal to transistor 158. At the same time, a capacitor 166 connected to an output terminal of comparator 156 is discharged. The ON signal is shown at the line labelled ON in FIG. 14 and illustrates that the ON signal is clamped to the value of +V so long as current through the shunt RS is less than the value of $I_{REF}$. As soon as the comparator 156 changes state and effects a shut off of transistor 158, current through the shunt RS ceases causing comparator 156 to resume its prior state and allowing the capacitor 166 to be rapidly charged through a resistor 168. Both comparators 154 and 156 are open collector outputs requiring the pull up resistor 168 and allowing a hard wired "OR" connection. A diode 170 connected between the output terminals of comparators 154 and 156 limits the minimum OFF interval for current decay to only the operation of the current regulate circuit 63'. Since the load current $I_L$ is not available for direct observation when the transistor 158 are not conducting, provision for an adequate OFF interval are supplied by the latch 139 within the PWM regulate circuit 152, as described with regard to FIG. 11, and is further augmented by action of capacitor 166 and resistor 168 at the output of comparator 156. More particularly, both the PWM oscillator incorporated in PWM regulate circuit 152 and the RC network connected to comparator 156 may be used to established a fixed OFF interval for inhibiting the PWM ENABLE signal.

Continuing with the description of the waveforms of FIG. 14, if the voltage reference $V_{REF}$ is set to a lower value as is shown during the time period T5, the comparator 154 will operate to delete the ON signal to the ON terminal of PWM regulate circuit 152 causing the ENABLE signal to be removed from the transistor 158 when the Vo voltage reaches the $V_{REF}$ voltage. This action can be seen by examination of the time period T6. For the time periods encompassing times T1, T2, T3 and T4, the current is regulated to a peak value established by the current reference signal $I_{REF}$. For the time periods T5, T6 and T7, the current $I_L$ is regulated by limiting the average voltage supply to the load by the reduction in the signal $V_{REF}$ and the operation of the voltage regulate circuit 152 and the comparator 154. It should be noted that the OFF interval T2 was initiated early enough in the oscillator clock cycle but the duration of the OFF time was established by the oscillator clock, i.e., the ENABLE signal was reinitiated at the time that the voltage on capacitor 124 was reset to its low level. The OFF interval at T4 was initiated so late that the minimum OFF interval was developed by the action of capacitor 166 and resistor 168 and the internal threshold of the PWM regulate circuit 152. The values of resistor 168 and capacitor 166 are used to optimize the response to various loads as represented by the motor reactance inductor 160 and resistor 162.

While the circuit of FIG. 13 does not eliminate discontinuity in control output when motor current approaches the regulate value, the requirement that the rising edge of the current waveform would have to reach the comparator 156 trigger level after a clock to experience the maximum OFF interval proivdes a resistance to locking into a severely reduced output of alternate ON-OFF cycles which previous circuits did not demonstrate.

Figure 15:
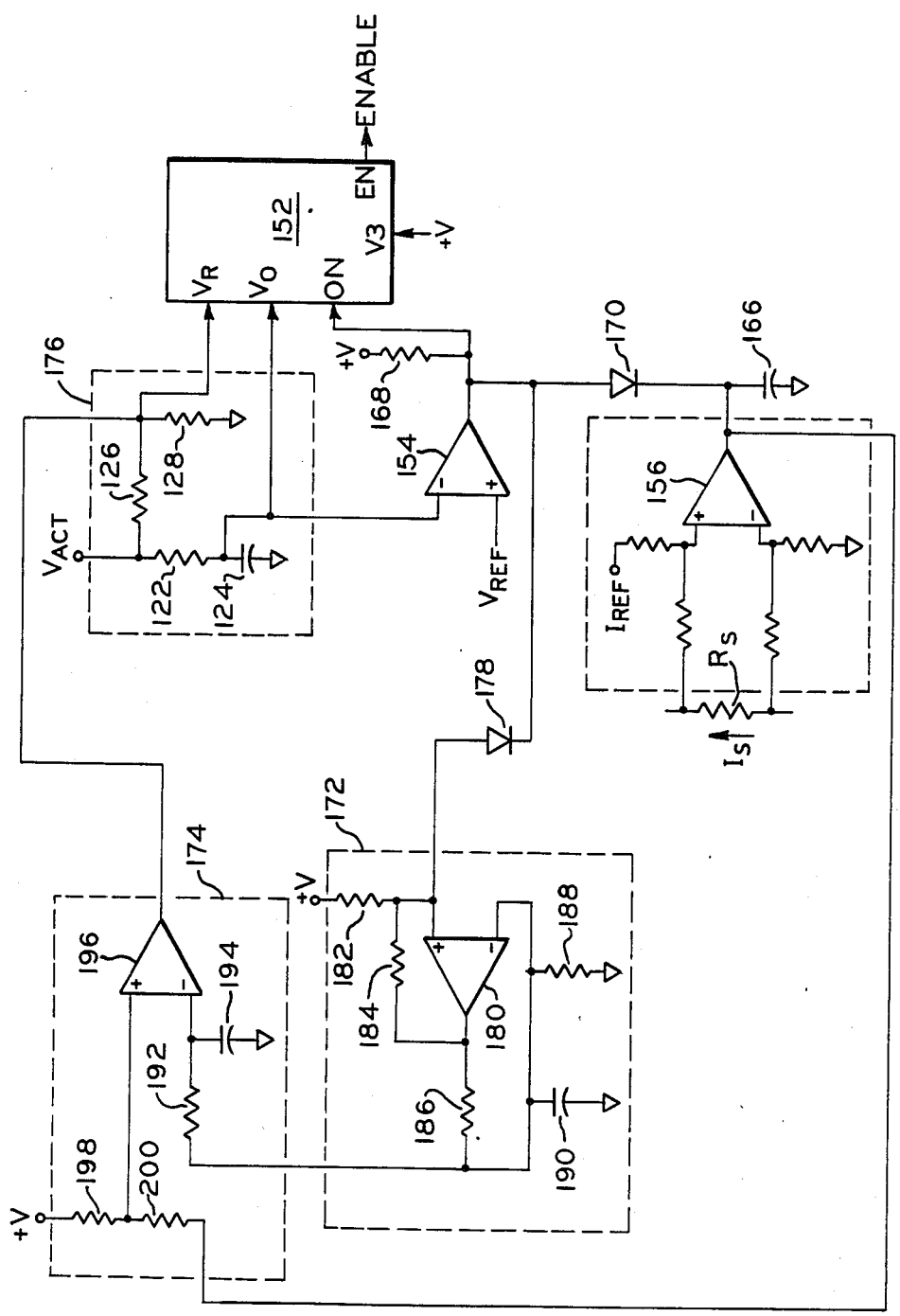
FIG. 15 is a schematic block diagram of a circuit in one form of the present invention for forcing a reset of the PWM oscillator external to the integrated PWM regulate circuit of FIG. 13.

The invention thus far described with regard to FIGS. 7 through 14 has disclosed circuitry to better regulate power and deliver it to a permanent magnet motor such as motor M. The portion of that circuity embodied in what has been identified as the PWM regulate circuit 152 is preferably incorporated into an integrated circuit and external circuitry is then connected to the integrated circuit to provide enhanced functions to the regulate circuit. One feature which is desirable for use with the PWM regulate circuit is an enhancement to the ratio of average to peak current developed without risking operation at too high a switching rate. As previously discussed, when power switching devices are subjected to high switching rates, the power dissipation increases requiring higher rated components for power control. In addition, when the switching components are operated at a fixed clock rate, an unfavorable ratio of peak current and average current can develop. Nevertheless, fixed clock rate PWM circuits are generally employed in order to limit the amount of switching losses in the power devices to a predetermined maximum. In some systems, the rise and fall time of load current can be utilized for effecting pulse width modulation control. However, as explained with regard to FIG. 13, for an ECM control system the motor circulating current is not available for direct observation when the power switching devices are not conductive. When the power switches are gated out of conduction, the motor current circulates internally due to the inductance in the windings, but this circulating current does not pass through the current shunt RS. Since the amount of current decay which occurs while the switching devices are not conducting is not monitored, in general a preset fixed off-time interval is provided and the switching devices switched into conduction at the end of the fixed off-time interval. The problem previously alluded to has been that a fixed off-time interval designed for an optimal current decay at high speed motor operation may allow too high a switching rate at low speed motor operation. A problem arises because the current rise time at high motor speed tends to be much slower than current rise time at low motor speeds due to the difference in counter electromotive force (CEMF) developed in the motor at low speed versus high speed. Similarly, at high speeds the current decay time tends to be much faster than the current decay time at low speeds due to the larger CEMF at high speeds. Thus, while a fixed clock rate circuit has the attribute of limiting the switching rate at all motor speeds, it does have the failing of allowing too long an off-time at high motor speed for optimum current decay. The circuits described in FIGS. 7 through 14 provide some correction for this problem by establishing a minimum off-time that inhibits too rapid reinstatement of power at the end of the fixed clock interval. However, if the current regulate pulse, i.e., the ON or RESET signal, occurs near the beginning of the fixed clock interval, i.e., at the time that the OSC signal is received, the off-time may persist for the balance of the fixed clock interval. The circuit shown in FIG. 15 provides additional protection of switching rates by forcing a reset of the clock oscillator with additional circuitry when at lease some minimum interval has elapsed since the last switching episode. This provides the minimum OFF interval for optimum current decay at high motor speed but inhibits too high a switching rate at a low speed.

Turning now to FIG. 15, the PWM regulate circuit 152 is essentially the same circuit as was described previously with regard to FIGS. 11 and 13. The comparators 154 and 156 are also shown in FIG. 13 along with their associated current monitoring through current shunt RS and minimum OFF interval circuit comprising the resistor 168, capacitor 166 and diode 170. The oscillator portion of the circuit comprising resistors 122, 126 and 128 and capacitor 124 are also disclosed in FIG. 13. The additional features are shown in blocks 172 and 174. The blocks 172 and 174 together comprise an event timer which is effective to reset the PWM oscillator (Block 176) upon termination of the PWM ENABLE signal by the current monitor circuit 63' when at least a minimum time has elapsed since an immediately preceding termination of the PWM ENABLE signal. The block 172 is coupled to an output terminal of comparator 154 by means of a diode 178 which has an anode connected to a noninverting input terminal of a comparator 180. A resistor 182 connects the noninverting input terminal to voltage source $+V$ while a feedback resistor 184 is connected between the noninverting input terminal and an output terminal of comparator 180. The timing function is affected by a feedback loop from the output terminal of comparator 180 through a resistor 186 to the inverting input terminal of the comparator. The loop includes parallel connected timing resistor 188 and capacitor 190 connected to ground. The signal developed at the output of block 172, essentially at the inverting input terminal of comparator 180, is coupled through an RC network comprising a resistor 192 and capacitor 194 to the inverting input terminal of another comparator 196 in block 174. An output terminal of comparator 196 is connected to the VR terminal of PWM regulate circuit 152. The block 174 further includes a voltage divider comprising resistors 198 and 200 serially connected between the output terminal of comparator 156 and positive voltage source $+V$. The terminal intermediate resistors 198 and 200 is connected to a noninverting input terminal of comparator 196. The block 172 thus comprises a timing means for providing a representation of a time interval between successive terminations of the PWM ENABLE signal while block 174 comprises means for comparing the time interval representation developed by block 172 to a predetermined voltage reference representative of a selected minimum time interval whenever the current monitoring means 63 terminates the PWM ENABLE signal. If the time interval since the last PWM ENABLE termination is greater than the selected minimum time interval, the block 174 provides a signal to PWM clock oscillator means 176 to effect a reset and begin a new clock interval.

Figure 16:
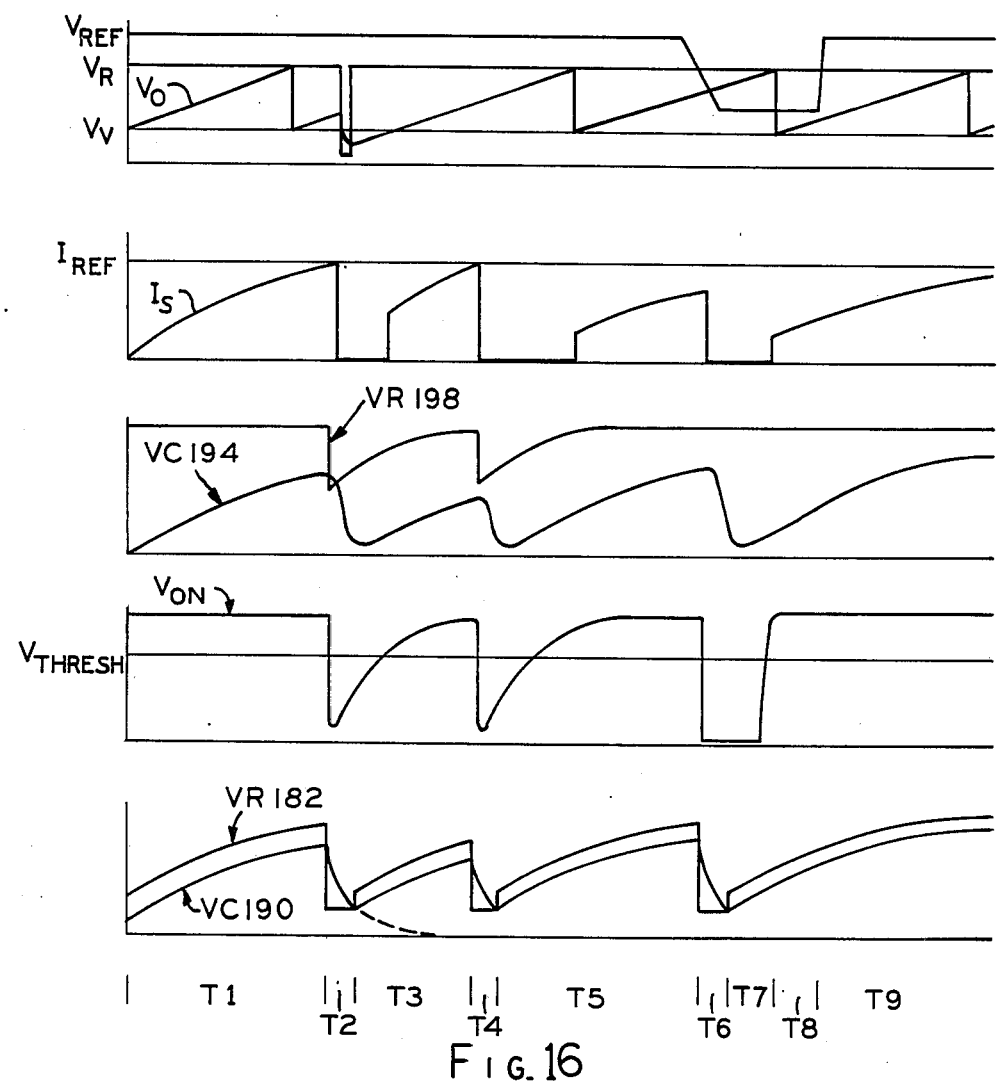
FIG. 16 is a waveform timing diagram for the circuit of FIG. 15.

For an understanding of the operation of the event timer in conjunction with the PWM regulate circuit, reference is now made to FIG. 16 which shows a series of timing diagrams for the overall circuit of FIG. 16. The top diagram illustrates the Vo voltage developed on capacitor C0. This voltage is essentially the ramp voltage previously described with regard to, for example, FIG. 12. The graph labelled $I_S$ represents the monitored current through the current shunt RS. The graph labelled VR198 represents the voltage developed intermediate the resistors 198 and 200 which is functionally related to the operation of comparator 156. The graph labelled VC194 represents the voltage developed at the inverting input terminal of comparator 196 across the capacitor 194. The graph labelled $V_{ON}$ represents the voltage deveoped at the output terminal of comparator 154, which voltage is supplied to the ON input terminal of PWM regulate circuit 152. The graph labelled VR182 represents the voltage developed at the noninverting input terminal of comparator 180 while the graph labelled VC 190 represents the voltage developed at the inverting input terminal of comparator 180.

Considering first the time period T1, the voltage Vo follows its normal pattern increasing from the valley reference voltage $V_v$ to the upper reference voltage $V_R$ set by PWM circuit 152. When the voltage Vo reaches the value of $V_R$, PWM circuit 152 generates a clock oscillator signal OSC and coincidentally energizes reset transistor Q1 (See FIG. 11) to discharge capacitor 124 and reset oscillator 176. Since the voltage Vo did not reach the $V_{REF}$ level, the comparator 154 does not change state at the time that the Vo voltage resets. Consequently, the switching transistors, e.g., transistor 158, controlling current to the motor windings do not change state and current continues to flow through the current shunt RS as shown by the graph $I_S$ as an increasing motor current. At the beginning of time period T2, the current $I_S$ reaches the $I_{REF}$ level causing the comparator 156 to change state and immediately pull down the voltage at the ON terminal of PWM regulate circuit 152 thereby effecting a turn off of the switching transistor supplying current to the motor windings. When the comparator 156 changes state, it goes to a low level thereby pulling the voltage intermediate the resistors 198 and 200 to a lower level so that the voltage VR198 applied to the noninverting input terminal of comparator 196 suddenly falls below the voltage VC194 at the inverting input terminal. This causes the comparator 196 to change state and pull the VR terminal of PWM regulate circuit 152 to a lower value. By comparison with FIG. 11, it can be seen that once the VR terminal is pulled to a lower value, it effects an immediate reset of the PWM oscillator by effecting a discharge of capacitor 124. The reset of capacitor 124 is shown at time T2. Since the voltage $V_{ON}$ at the output of comparator 154 is also pulled down by the action of comparator 156, this reduced voltage is coupled through the diode 178 to the noninverting input terminal of comparator 180 causing comparator 180 to change state and forcing the capacitor 190 to begin discharging. The effect of the discharge is shown in the graph of VC190. The discharge of capacitor 190 continues until the capacitor voltage falls to the level of the voltage VR182 at the noninverting input terminal comparator 180. At this point, i.e., at the end of time period T2, the comparator 180 changes state and allows capacitor 190 to again begin charging. The devices controlling power to the ECM motor M are not allowed to be in conduction until the voltage $V_{ON}$ at the ON input terminal of PWM regulate circuit 152 crosses the voltage threshold set internally by the PWM regulate circuit. At the end of time period T3, the comparator 156 again changes state when the peak current through shunt RS exceeds the value of the reference current $I_{REF}$. However, at this time the voltage VC194 at the inverting input terminal of comparator 196 has not risen sufficiently for the voltage VR198 to fall below the level of the voltage VC194. In other words, the time since the last reset of the PWM oscillator has not been sufficient to allow capacitor 194 to charge to a voltage above the predetermined minimum VR198 voltage. Consequently, the comparaor 196 does not change state and the PWM oscillator 176 is not reset by the action of comparator 156. As a consequence, at the end of the next PWM oscillator cycle, the switching transistors are again enabled as shown at time T5. It will be apparent that the minimum required time from the previous OFF signal ($I_S$ current interruption) should be less than the period of the PWM oscillator for proper operation.

At time T6, the reference voltage $V_{REF}$ is lowered so that the system goes into an average voltage regulate mode rather than a peak current regulate mode resulting in the comparator 154 changing state at the time that the voltage Vo crosses the $V_{REF}$ threshold. The action of comparator 154 is to effect a turn off of the switching transistors controlling current to the motor M as shown by the immediate cessation of current $I_S$ at time T6. Because the diode 170 decouples the operation of comparator 154 from capacitor 166, a reset of the event timer circuit occurs each time that comparator 154 changes state, as shown by the voltage VC190, but the voltage VR198 remains at a constant high level. This prevents a reset of the PWM oscillator 176 during average voltage control since the comparator 196 is prevented from changing state. The reason for avoiding the reset of the oscillator is that such reset would interfere with the average voltage regulation. Furthermore, reset of the oscillator at or near the voltage regulated value would interfere with the desired increase in average to peak current ratio.

Figure 17:
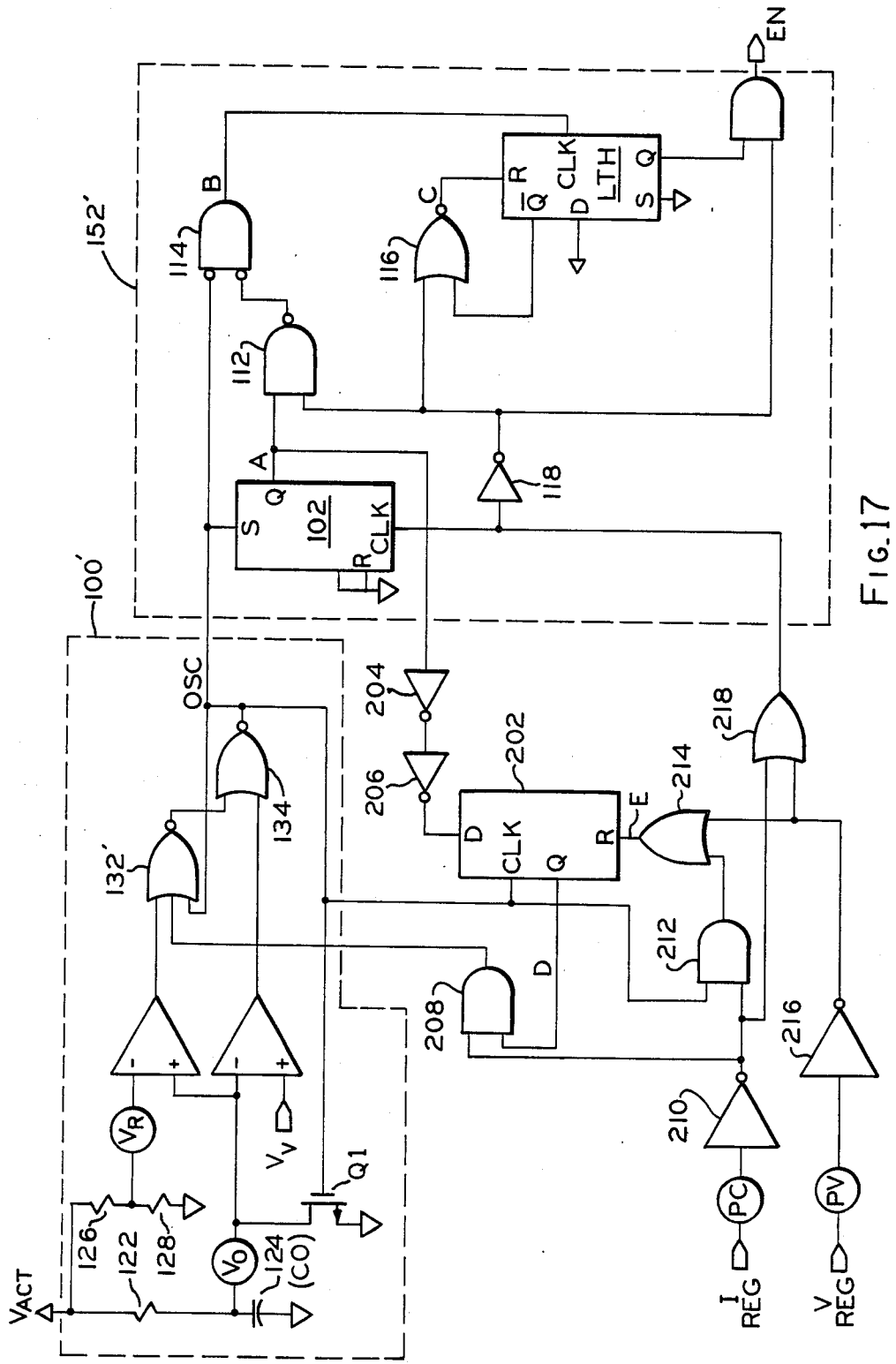
FIG. 17 is a schematic block diagram of another form of the present inventive PWM control for extablishing a minimum period and fixed off-time.

FIG. 17 illustrates changes which can be made in the PWM regulate circuit 152 to achieve at least some of the objectives of the invention without the external circuitry shown in FIG. 15. The circuitry shown in FIG. 17 will be recognized as comprising at least some of the circuitry illustrated as forming the PWM oscillator 100 described in FIG. 11 and in the PWM latch circuit illustrated in FIG. 9. In the circuit of FIG. 17, the elements common to FIGS. 9 and 11 are identified with the same reference numerals. In general, the changes in the circuit include the elimination of the minimum OFF interval at the end of the PWM oscillator period and the addition of separate voltage and current regulate terminals with the circuitry which enables reset of the PWM oscillator at the initiation of a current regulate or RESET signal. It will be noted however, that the logical NOR gate 132 has been replaced by NOR gate 132' having an additional input terminal to allow forced reset of the PWM oscillator. An additional D type flip-flop 202 has been added for the purpose of storing the prior state of flip-flop 102 at the rising edge of the oscillator clock signal obtained from the output of NOR gate 134. The Q output terminal of flip-flop 102 is connected to the D input terminal of flip-flop 202 through first and second serially connected inverters 204 and 206. The two inverters are incorporated in order to delay the signal transmission from flip-flop 102 to flip-flop 202 for a time period sufficient to assure that a race condition does not occur between the time that the oscillator clock clock signal is generated and supplied to each of the flip-flops 102 and 202. The Q output terminal of flip-flop 202 is connected to a first input terminal of AND gate 208 whose output terminal is connected to the third input terminal of NOR gate 132'. The AND gate 208 initiates the reset of gate 132' and a peak current regulate pulse (a RESET signal) is detected and the state of the Q output terminal of flip-flop 202 indicates at least one PWM oscillator period has elapsed since the last PSM off signal. In this regard, a second input terminal of AND gate 208 is connected to receive the RESET signal generated by the comparator 156 (FIG. 13) and coupled to AND gate 208 through an inverting Schmidt trigger circuit 210. For clarity, the RESET signal is indicated as a current regulate signal in FIG. 17. The current regulate signal encompasses both logical output states of comparator 156, i.e., a logical 0 or RESET signal state when current $I_S$ is greater than current $I_{REF}$ and a logical 1 state when $I_S$ is less than $I_{REF}$. The flip-flop 202 and its associated logic gates 214, 208, 206, and 204 thus comprises means for inhibiting reset of the clock oscillator means shown in block 152' during any clock interval when an immediately preceding clock interval was less than a normal clock interval duration, i.e., resetting is not permitted in successive clock intervals.

The circuit 210 also couples the current regulate signal or RESET signal to a first input terminal of an AND gate 212 whose output terminal is connected through an OR gate 214 to a reset (R) terminal of flip-flop 202. A second input terminal of AND gate 212 is connected to receive the clock oscillator signal OSC from NOR gate 134. The function of AND gate 212 is to delay the reset of flip-flop 202 until the PWM oscillator is reset even though a current regulate pulse is received before a clock signal.

The voltage regulate pulse generated by the comparator 154 (FIG. 13) is coupled through another inverting Schmidt trigger circuit 216 to another input terminal of OR gate 214. The circuits 210 and 216 provide a degree of noise immunity to the system, particularly at power turn-on when current and voltage spikes are common. The OR gate 214 allows either the current regulate or voltage regulate signals to control the reset of flip-flop 202. Output signals generated by both circuit 210 and circuit 216 are also coupled to respective input terminals of an OR gate 218 whose output terminal is connected to the clock terminal of flip-flop 102 and also to the input terminal of inverter 118. The OR gate 218 effectively combines the current and voltage regulate signals for generating the previously described ON signal applied to the PWM regulate circuit, 152.

Figure 18:
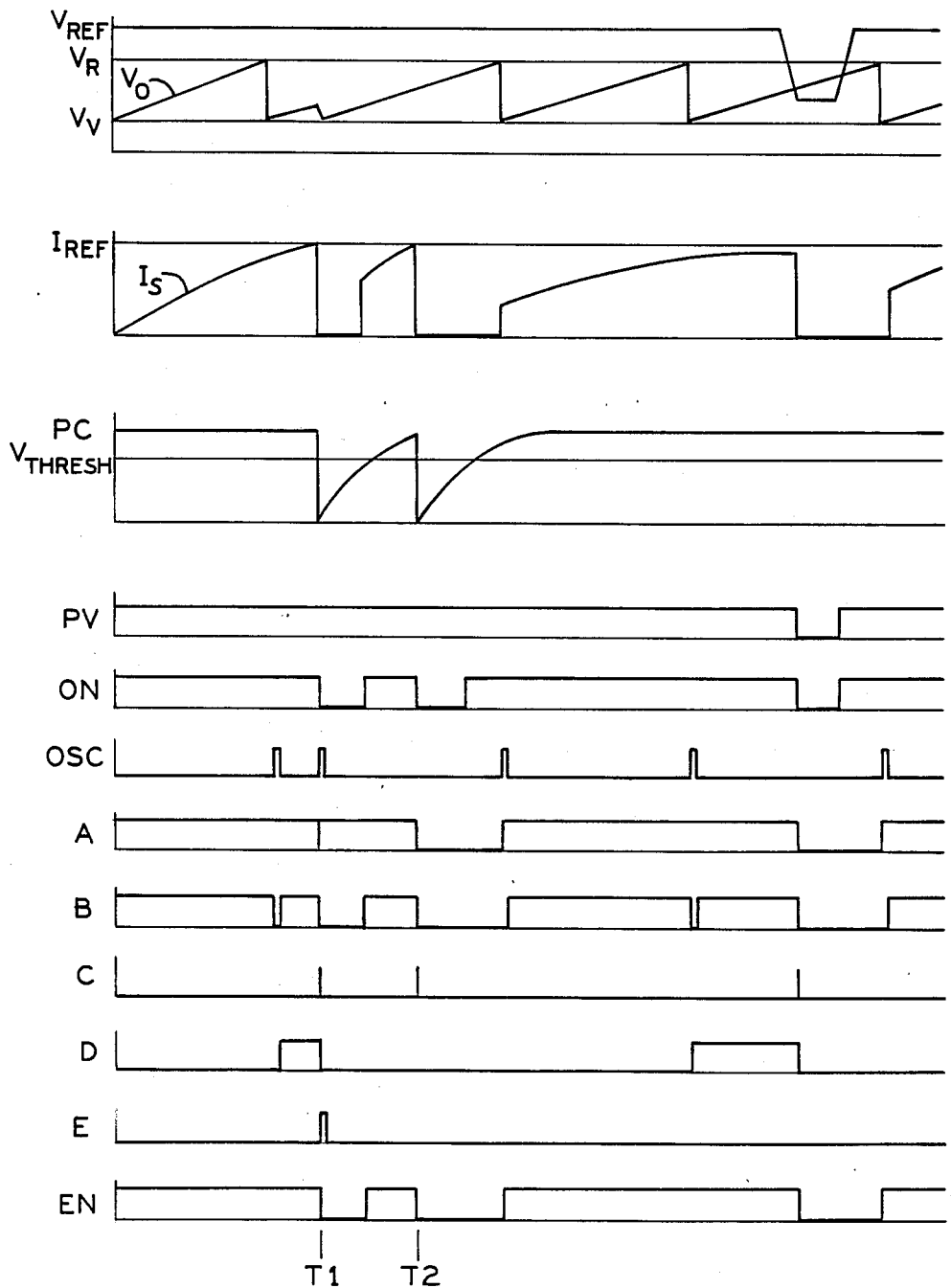
FIG. 18 is a waveform timing diagram from the circuit of FIG. 17.

For a better understanding of the operation of the system of FIG. 17, reference may be had to FIG. 18 which illustrates timing diagrams and logic levels critical to the operation of the circuit of FIG. 17. The first or top graph again represents the oscillator voltage Vo developed across capacitor 124. The V_REF is shown overlaying the Vo graph. The second graph labelled I_S again represents the current through the current shunt RS. The graph labelled PC represents the current regulate signal developed at the output of comparator 156. The graph PV represents the voltage regulate signal developed by comparator 154. The graph labelled OSC represents the corresponding clock signal at the output of NOR gate 134. The line A represents the signals developed at the Q output terminal of flip-flop 102 while the line B represents the signals developed at the output terminal of logic gate 114. The line C represents the signals developed at the output of logic gate 116 and line D represents the signals developed at the Q output terminal of flip-flop 203. Line E represents the output signals developed at the output terminal of gate 214 and applied to the reset terminal of flip-flop 202. The line labelled EN again represents the ENABLE signals, i.e., the PWM signal, provided to the commutation control circuit 57 (See FIG. 4) for the switching transistors controlling power to the ECM motor. The first event of significance is indicated at time T1 when the PWM oscillator voltage Vo is reset as a consequence of the current I_S reaching the I_REF threshold. Particularly, the current regulate signal developed at terminal PC changes state and since the logic level at the Q output terminal of flip-flop 202 is at a high level due to the logic level at the output of flip-flop 102 being at a high level, the AND gate 208 is triggered to effect a reset of the PWM oscillator and generation of an OSC clock signal. Note that the OSC clock signal is coupled through the logic gates 212 and 214 to effect a reset of the flip-flop 202.

When the PC or current regulate signal triggers the Schmidt circuit 210, the changed output state of the circuit 210 is coupled through OR gate 218 to effect a reset of latch LTH and generate an ENABLE signal allowing the power switching devices to be gated into conduction and current to again be applied to the motor windings. At time T2, the next occurring peak current regulate (RESET) signal occurs effecting a termination of the ENABLE signal. However, since a complete PWM oscillator period had not elapsed since the previous PWM OFF signal, the peak current regulate signal fails to force a reset of the PWM oscillator. At time T3, there is shown the effect of dropping the voltage V_REF below the Vo voltage to force a turn off of the power switching devices. It should be noted that the effect of Vo exceeding V_REF does not force a reset of the PWM oscillator. However, as shown on line D, the Q output signal from flip-flop 022 is reset by the action of the voltage regulate signal. Nevertheless, the next ENABLE signal is only generated upon the production of an oscillator clock signal OSC at the end of the timing cycle established by the Vo voltage.

Although particular embodiments have been disclosed and described herein, it will be readily apparent that numerous modifications may be made and still be within the true spirit and scope of the teachings of the present invention. Therefore, it is intended by the appended claims to cover all such modifications which fall within the true spirit and scope of the present invention.

What I claim as new and desire to secure by letters patent of the United States is:

1. A pulse width modulation (PWM) control system for an electronically commutated motor (ECM) adapted to be energized from a direct current (DC) power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

electronic switching means connected to each winding stage terminal for selectively coupling each terminal to the DC power source for applying to at least some of the winding stages a DC voltage in the at least one preselected sequence for supplying a current to the winding stages to effect the energization of the ECM and the rotation of the rotatable assembly;

clock means for providing periodic clock signals for establishing a pulse width modulation cycle;

means connected to said switching means for enabling said switching means in pulse width modulation cycles, including means for deriving a PWM enable signal in response to a one of the clock signals when current supplied to the ECM is less than a predetermined value, said enabling means further including means responsive to termination of said PWM enable signal within a predetermined time of occurrence of one of said clock signals for delaying initiation of a pulse width modulation cycle until after the occurrence of said one of said clock signals; and means responsive to termination of said PWM enable signal during a PWM cycle for resetting said clock means for establishing another pulse width modulation cycle when at least a minimum time interval has elapsed since an immediately prior PWM cycle termination.

2. A pulse width modulation (PWM) control system for an electronically commutated motor (ECM) adapted to be energized from a direct current (DC) power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

power switching means coupled in circuit with each winding stage terminal for selectively connecting each terminal to a DC power source for applying to at least some of the winding stages a DC voltage in the at least one preselected sequence to effect the energization of the ECM and the rotation of the rotatable assembly;

signal processing means for generating switching signals for identifying selected ones of said power switching means for energization in order to connect each terminal to the DC power source in the at least one preselected sequence;

pulse width modulation (PWM) means for generating a PWM enable signal for energizing the selected ones of said power switching means, said PWM means including clock means for generating periodic clock signals defining sequential clock intervals of a predetermined duration, current monitoring means for providing a first signal when current supplied to the ECM is less than a predetermined value and a second signal when current supplied to the ECM is greater than the predetermined value, logic means responsive to said second signal for terminating said PWM enable signal, said logic means initiating said PWM signals in response to receipt of a one of said clock signals occurring during presence of said first signal, and said logic means being effective to store a one of said clock signals received during presence of said second signal to thereby generate said PWM enable signals upon occurrence of said first signal.

3. The control system of claim 2 and including means for selectively establishing a minimum time period during each clock interval in which said PWM enable signal is inhibited.

4. The control system of claim 3 and including voltage control means for terminating said PWM enable signal when a time integral of voltage applied to said ECM reaches a predetermined value.

5. The control system of claim 4 and including means for inhibiting said minimum time period when said voltage control means terminates said PWM enable signal.

6. The control system of claim 5 and including means for resetting said clock means upon termination of said PWM enable signal by said current monitoring means when at least a minimum time interval has elapsed since an immediately preceding termination of said PWM enable signal.

7. The control system of claim 6 wherein said resetting means comprises:
  timing means for providing a representation of a time interval between successive terminations of said PWM enable signal, said timing means being coupled to said voltage control means and said current monitoring means for detecting termination of said PWM enable signal; and
  means for comparing said time interval representation to a predetermined reference representative of said minimum time interval upon generation of said second signal from said second signal from said current monitoring means, said comparing means being coupled to said clock means for effecting a reset thereof when said time interval representation exceeds said minimum time interval reference.

8. The control system of claim 7 wherein said logic means includes means for inhibiting resetting of said clock means during a clock interval when an immediately preceding clock interval is less than the predetermined clock interval duration.

9. A pulse width modulation (PWM) control system for an electronically commutated motor (ECM) adapted to be energized from a direct current (DC) power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:
  power switching means coupled in circuit with each winding stage terminal for selectively connecting each terminal to a DC power source for applying to at least some of the winding stages a DC voltage in the at least one preselected sequence to effect the energization of the ECM and the rotation of the rotatable assembly;
  signal processing means for generating switching signals for identifying selected ones of said power switching means for energization in order to connect each terminal to the DC power source in the at least one preselected sequence;
  pulse width modulation (PWM) means for generating a PWM enable signal for energizing the selected ones of said power switching means, said PWM means including clock means for generating periodic clock signals defining sequential clock intervals of a predetermined duration; and
  logic means coupled to said PWM means for limiting the cycling of said PWM enable signal to once per clock interval.

10. A method for pulse width modulation (PWM) control of a permanent magnet motor adapted to be energized from a DC power source and including a stationary assembly having a plurality of winding stages adapted to be electronically commutated in at least one preselected sequence, a rotatable assembly associated in selective magnetic coupling relation with the winding stages, each winding stage having a terminal associated therewith, and electronic switching means connected to each winding stage terminal for selectively coupling each terminal to the DC power source for applying to at least some of the winding stages a DC voltage in the at least one preselected sequence for supplying a current to the winding stages for effecting the energization of the motor and the rotation of the rotatable assembly:
  providing control signals for application to the electronic switching means for enabling the switching means in the at least one preselected sequence;
  generating a sequence of periodic clock signals having a predetermined time duration between successive ones of the signals;
  generating a PWM enable signal in response to each of the clock signals;
  summing the control signals and the PWM enable signal;
  applying the summed signals to the electronic switching means for energizing the ECM winding stages and developing a current therein;
  terminating the PWM enable signal when current in the winding stages reaches a predetermined value;
  inhibiting generation of a PWM enable signal for at least the time duration of a one of the clock signals when the step of terminating is within a predetermined time interval of the one of the clock signals;
  terminating the PWM enable signal for at least a predetermined minimum time period when the clock signal is generated prior to current in the winding stages reaching the predetermined value; and
  inhibiting the PWM enable signal for at least another predetermined minimum time period during each PWM cycle.

11. The method of claim 10 and including the further step of terminating the PWM enable signal when a time integral of voltage applied to the winding stages reaches a predetermined value.

12. The method of claim 11 and including the step of inhibiting termination of the PWM enable signal upon occurrence of the clock signals during ECM voltage regulation.

13. The method of claim 11 and including the step of resetting the clock signals upon termination of the PWM enable signal in response to ECM current reaching a predetermined value when at least a minimum time has elapsed since an immediately preceding PWM enable signal termination.

14. The method of claim 13 wherein the step of resetting comprises the steps of:
  determining the time interval between successive terminations of the PWM enable signal;
  comparing the determined time interval to the minimum time interval; and
  initiating a new clock cycle when the minimum time interval is less than the determined time interval.

* * * * *